(12) United States Patent
Glaser

(10) Patent No.: US 11,922,259 B2
(45) Date of Patent: Mar. 5, 2024

(54) UNIVERSAL PRODUCT LABELING FOR VISION-BASED COMMERCE

(71) Applicant: Grabango Co., Berkeley, CA (US)

(72) Inventor: William Glaser, Berkeley, CA (US)

(73) Assignee: Grabango Co., Berkeley, CA (US)

( * ) Notice: Subject to any disclaimer, the term of this patent is extended or adjusted under 35 U.S.C. 154(b) by 0 days.

(21) Appl. No.: 17/810,613

(22) Filed: Jul. 4, 2022

(65) Prior Publication Data

US 2023/0004736 A1 Jan. 5, 2023

Related U.S. Application Data

(63) Continuation of application No. 17/322,105, filed on May 17, 2021, now Pat. No. 11,409,977.

(60) Provisional application No. 63/025,655, filed on May 15, 2020.

(51) Int. Cl.
*G06K 7/10* (2006.01)
*G06K 7/14* (2006.01)

(52) U.S. Cl.
CPC ....... *G06K 7/10722* (2013.01); *G06K 7/1417* (2013.01)

(58) Field of Classification Search
CPC .......... G06K 7/1417; G06K 7/10722
USPC ................... 235/462.11
See application file for complete search history.

(56) References Cited

U.S. PATENT DOCUMENTS 10,262,176 B1 * 4/2019 Powell ............ G06K 19/06028
2014/0201094 A1 7/2014 Herrington et al.

* cited by examiner

*Primary Examiner* — Toan C Ly
(74) *Attorney, Agent, or Firm* — Alpine Patents LLC; Brian Van Osdol Van Osdol

(57) ABSTRACT

A system and method for computer vision assisted physical-labels functions to use functional, large format product labeling for better computer vision (CV) identification. The product labels and detection capabilities of the system and method enhance product label detection and interpretation for use with image sensing at a distance. The product labels are non-obtrusive and can mitigate changes to sizing or visual appearance of packaging of goods or products. The system and method can enable universal product labeling for vision-based commerce and other applications.

24 Claims, 17 Drawing Sheets

US 11,922,259 B2

UNIVERSAL PRODUCT LABELING FOR VISION-BASED COMMERCE

CROSS-REFERENCE TO RELATED APPLICATIONS

This Application is a Continuation Application of U.S. patent application Ser. No. 17/322,105, filed on 17 May 2021, which claims the benefit of U.S. Provisional Application No. 63/025,655, filed on 15 May 2020, both of which are incorporated in their entirety by this reference.

TECHNICAL FIELD

This invention relates generally to the field of physical product labeling and detection, and more specifically to a new and useful system and method for universal product labeling for vision-based computer-implemented commerce.

BACKGROUND

There is increasing interest in technology solutions for automating operations within retail environments. There are many efforts for using computer vision to create automated checkout systems leveraging new forms of sensing and monitoring. A large challenge of these systems is identifying products.

The existing infrastructure for identifying products is setup for manual entry of product information into traditional point of sale systems. For example, products sold in-store are often identified using a barcode representation of a universal product code (UPC) or some other product identifier. Products are scanned by properly positioning a product in close proximity to a barcode reader. Traditional barcodes (linear barcodes or 2D barcodes) however, have limited use for computer vision and/or other sensor-based monitoring systems since they are often printed at a size and resolution for close-proximity reading using a point of sale barcode scanner. The barcodes are additionally often marked on discrete regions of the product, like the bottom or back of a box.

Many barcode formats like QR (Quick Response) codes use encoding protocols and formats that were designed for situations where they can be read using close-proximity scanning or at least scanning with high pixel coverage. For example, QR codes are often read using a camera that is positioned so that the QR code takes up a sizable portion of the image, usually with the area of the QR code being captured by tens of thousands or even greater than hundreds of thousands of pixels. There is a tradeoff on read distance, imaging quality of camera and by association cost of camera, and size of a QR code. In some common practices, QR codes are sized so that the QR code is sized a tenth of the target scan distance. For example, a QR code can be one square inch if planned for scanning at one foot, but may be sized one square foot if planned for scanning at 10 feet. Those sizes can be impractical in many use cases.

Thus, there is a need in the product labeling field to create a new and useful system and method for computer vision assisted physical-labels. This invention provides such a new and useful system and method.

DESCRIPTION OF THE EMBODIMENTS

The following description of the embodiments of the invention is not intended to limit the invention to these embodiments but rather to enable a person skilled in the art to make and use this invention.

1. Overview

A system and method for computer vision assisted physical-labels functions to use functional, large format product labeling for better computer vision (CV) identification. The product labels and detection capabilities of the system and method are preferably enhanced for use with image sensing at a distance. The product labels are preferably substantially non-obtrusive and may mitigate changes to sizing or visual appearance of packaging of goods or products. These may be made to enable universal product labeling for vision-based commerce and other applications.

The system and method preferably enable product identification at a distance using camera-based monitoring of an environment. As an exemplary application of the system and method, the system and method may enable remote reading of product identifiers of a set of products shelved or otherwise stored in a store and captured in the image data of a camera positioned from an elevated position (e.g., above a shelving unit in a shopping aisle). Imaging devices may be positioned nine feet or more from some products of interest.

The system and method are preferably applied in enabling CV-based machine-readable codes to assist in identifying a product in an environment. The system and method may additionally be used in identifying a plurality of products in an environment. The system and method can therefore be used in reducing product identification errors. The system and method may additionally reduce computational cost for sensor-based monitoring of such environments by alleviating the system from using more computationally expensive identification processes for every product. Though use of the system and method may be performed in combination with CV identification or classification processes.

The system and method may include a variety of product label features which may be used in isolation or in combination.

Figure 2:
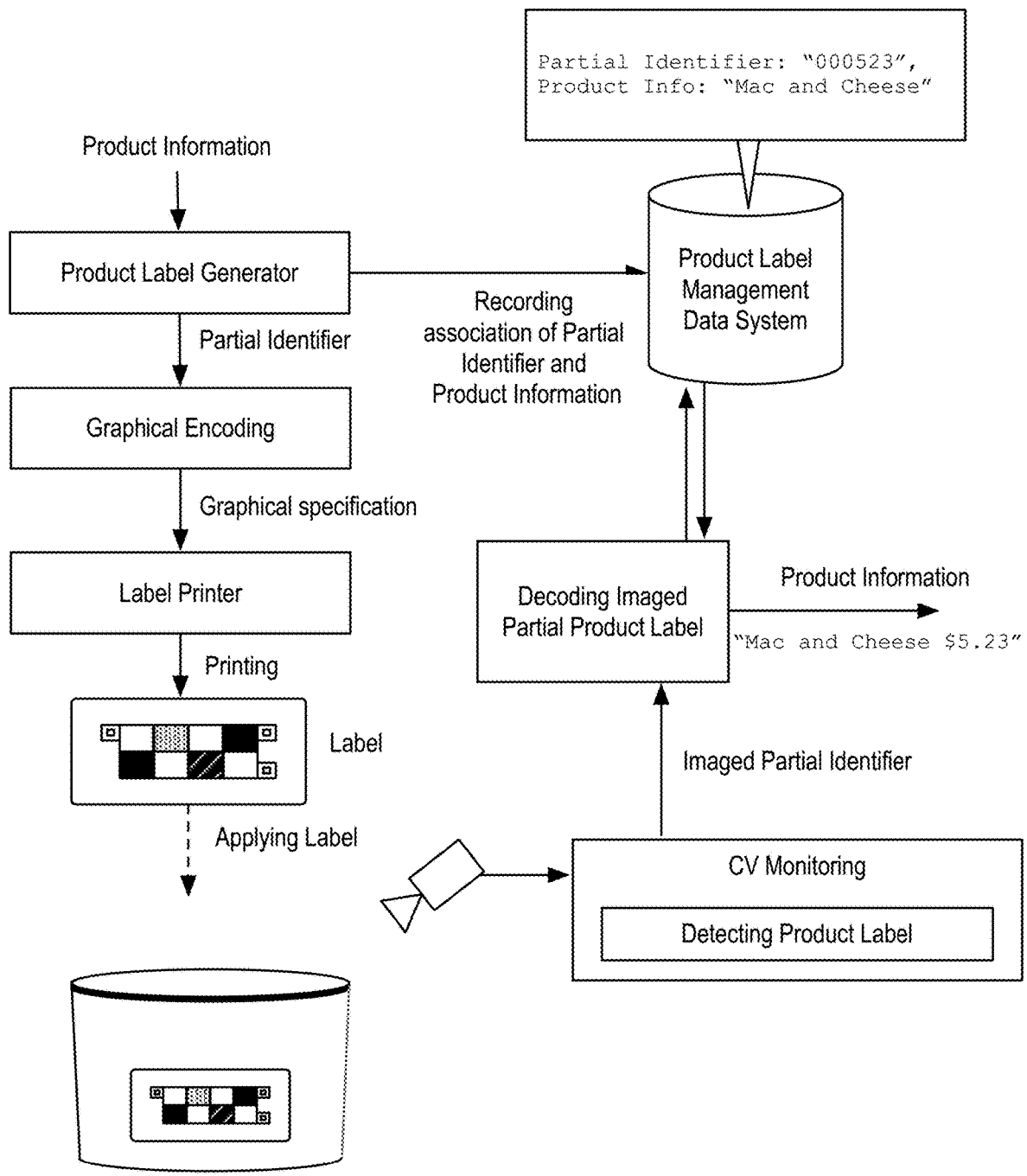
FIG. 2 is a schematic flow diagram representing processing of a partial product label.

One variety of product label features would be enabling product labels with low pixel imaging requirements. Some variations may enable per-label pixel data to be significantly reduced compared to traditional. In some exemplary implementations, product labels may be detected and translated into appropriate product identifiers while capturing less than a few hundred pixels. This may be enabled using partial labels that can use contextual information (detected using a sensing system like a CV monitoring system) in resolving the partial label into a full product identifier as shown in FIG. 2.

As another variety of product label features, product labels may be made invisible or substantially unnoticeable by a human, but reliably identified by a machine from image data collected from a monitoring system. The product labels may employ use of paints, coatings, pigments or structural color that absorb or reflect light in the non-visible spectrum (e.g., UV or IR light). This feature may enable some product labels to be printed larger without significantly impacting visual appearance of a product.

Other product label features are further described herein.

The system and method can be used in identifying a product identifier like a universal product code (UPC) or other suitable type of product identifier or descriptor. In one variation, the system and method may be used in place of computer vision product identification (e.g., determining a product identifier directly from analysis of image data). This may be useful for packaged products. This may, however, be particularly useful for products with few visually distinguishing features, where CV product identification may not be feasible. In grocery stores and convenience stores, the product identification capabilities enabled through the system and method may be particularly applicable in detecting, tracking, and/or otherwise monitoring custom items such as pre-packaged bulk goods (using generic packages and applied individual price labels), custom ordered items (like items from a meat or deli counter), and/or other items which may be generically packaged which traditionally used sticker price labels.

In another variation, the system and method may be used in combination with forms of computer vision analysis. For example, the system and method may additionally or alternatively be particularly helpful in differentiating between varieties of similarly packaged products. For example, the product labeling of the system and method may improve differentiation between flavor variations, scent variations, and/or other product variations of one brand of product. These products at times can have product and packaging differences that are difficult to differentiate visually, especially using a camera that may be placed more than eight feet away.

The system and method may additionally be used in differentiating or identifying particular instances of a product. While the system and method are mostly described herein for how product labeling is used to identify the product identifier, the system and method may similarly be used for identifying a specific instance of a product. An instance identifier may additionally or alternatively be communicated through the labeling described herein. An instance variation may assist in detecting if a user removed an item from a shelf, tracking the location and interactions with a particular product, counting the number of items selected by a user, and/or performing other tasks that may relate to the specific state of an instance of a product.

In a similar manner, identifying particular instances of an object may be useful when a "product" is a one-off product. In some situations, such as made-to-order items in a grocery store, each item is a unique instance with its own item identifier used in defining a line item in a checkout process. A CV monitoring system can use the system and method to detect and identify such one-off items, and then track the state of those items (e.g., location) and interactions with those items (e.g., detecting a user picking up the item).

Some variations of the system and method may additionally or alternatively be used in other forms of environment marking and labeling. The labeling techniques of the system and method could be used for signage and marking of unmarked products such as produce. For example, a produce section of a store may use such product identification labeling techniques on the customer-facing signs. The labeling techniques may also be used for other applications within a CV-based application or other form of ambient computing environment. As a limited list of exemplary uses of the labeling techniques, the system and method may be used in marking a POS (point of sale) station, marking a region of a store to prevent tracking (e.g., marking the floor region around a pharmacy or banking region of a store), marking entrances, marking exits, marking checkout regions, marking regions to perform some action based on people presence in that region, and/or providing other object or region labeling. Such labels may be implemented as stickers or signs that can be positioned in suitable positions without compromising the human-perceived visuals of the environment. With increasing use of computer vision enabled monitoring, the product labels of the system and method may have a wide variety in marking objects or the environment with detectable and readable labels.

The system and method can have particular applications in a retail environment. A grocery store is used as an exemplary retail environment in the examples described herein, however the system and method is not limited to retail or to grocery stores. In other examples, the system and method can be used in supermarkets, department stores, apparel stores, bookstores, hardware stores, electronics stores, gift shops, and/or other types of shopping environments. Furthermore, the system and method are primarily described in how it can be used in identifying a product, but the system and method may more generally apply to any form of labeling that is unobtrusive/invisible to humans and reliably detectable by a remote CV monitoring system. References or descriptors of the term "product" may be generalized to other types of objects. Similarly, references to or descriptors using object, may be applied to products or other suitable types of objects. The system and method may be used in any suitable ambient computing environment, augmented reality applications, signage used by robots or other automated systems, signage geared to autonomous vehicles, and/or other CV-based applications.

Preferably, the system and method are used in combination with a monitoring system used for automated or semi-automated checkout. Herein, automated and/or semi-automated checkout is primarily characterized by a system or method that generates or maintains a virtual cart (i.e., a checkout list) during the shopping experience with the objective of tracking the possessed or selected items for billing a customer. The checkout process can occur when a customer is in the process of leaving a store. The checkout process could alternatively occur when any suitable condition for completing a checkout process is satisfied such as when a customer selects a checkout option within an application.

A virtual cart may be maintained and tracked during a shopping experience through use of one or more monitoring systems. In performing an automated checkout process, the system and method can automatically charge an account of a customer for the total of a shopping cart and/or alternatively automatically present the total transaction for customer completion. Checkout transactions may be processed by a checkout processing system through a stored payment mechanism, through an application, through a conventional PoS system, or in any suitable manner.

One variation of a fully automated checkout process may enable customers to select items for purchase (including produce and/or bulk goods) and then leave the store. The automated checkout system and method could automatically bill a customer for selected items in response to a customer leaving the shopping environment. The checkout list can be compiled using computer vision and/or additional monitoring systems. In a semi-automated checkout experience variation, a checkout list or virtual cart may be generated in part or whole for a customer. The act of completing a transaction may involve additional systems. For example, the virtual cart can be synchronized with (or otherwise transmitted to) a point of sale (POS) system manned by a worker so that at least a subset of items can be automatically entered into the POS system thereby alleviating manual entry of the items.

Detection of product labels may be used in the identification of products selected by a customer when tracking interactions of the user using computer vision. In some cases, select types of products may make use of special product labels and product label identification procedures. For example, custom items may benefit from special labels that are used in detecting item specific information like weight-based pricing. Such customer items may be encountered in grocery stores at deli counters, made-to-order counters, meat counters, cheese sections, bulk good sections, and the like.

The system and method may provide a number of potential benefits. The system and method are not limited to always providing such benefits, and are presented only as exemplary representations for how the system and method may be put to use. The list of benefits is not intended to be exhaustive and other benefits may additionally or alternatively exist.

As one potential benefit, the system and method can result in better product identification by a CV monitoring system. The system and method can enable more reliable detection of a product identifier from a remotely positioned camera, functions to improve product identification from a distance. Such explicit product identification can be particularly useful in differentiating between visually subtle product varieties.

As another potential benefit, the system and method may be used in differentiating and/or identifying between different instances of a product. For example, the system and method may be used for reliably differentiating between two boxes of the same product. This may relieve a monitoring system like a CV monitoring system from individually tracking the object to confidently track that a product seen at a first instance is the same (or different) product seen at a second instance. Similarly, the system and method may identify products that are single instance objects or those that are generically packaged. For example, the system and method may be useful in tracking made-to-order or individually pre-packaged items within a grocery store.

As another potential benefit, the system and method may be used more generally less obtrusively (e.g., using smaller but readable labels) and/or even transparently (e.g., using non-visible labeling) labeling items in a monitored environment. In some cases, this may be used for marking objects and/or the environment in a way that alters the operation of a CV monitoring system.

As a potential benefit for some variations using partial identifier labels, the system and method may enable labels that can be translated with less pixel-coverage. In a way, the system and method can provide performance enhancement of an imaging device by increasing the label reading distance of a given imaging device. This may be of great importance in applications where a large number of cameras are to be used. In some CV-based automated checkout systems, an environment may have hundreds or thousands of cameras. By increasing the label read distance of each camera, fewer cameras and/or cheaper cameras may be used thereby reducing data and processing requirements of the system and also the cost of the system. For example, a lower resolution camera may be used to read a product label from a distance greater than nine feet from the label.

As a potential benefit for some variations, the system and method can enable product labels to be made larger while also visually discrete. In some variations using non-visible labels, the entire face of a product box may be used for product labeling while at the same time not impacting the use of the face of the product box to be used for human-targeted marketing. Larger labels can be more easily captured and read from image data collected from a remote camera and/or a cheaper imaging device (e.g., a lower-resolution camera). Additionally, such "transparent" labeling can enable the labels to be applied to more surface of a product. As one example, a product label may be applied to each face of a box such that reading of the product label can happen independent of how the product is presented in the store.

As another related benefit, the system and method may improve off-angle product identification; the expected vantage point of a camera can be anticipated and integrated into the physical design of a label. For example, the labels may be designed for off-angle imaging from a camera positioned above a shopping region.

As another potential benefit, the system and method can produce an easy and cheap way of labeling products. In some variations of the system and method, minor adjustments to the printing process can be used to enable such labeling mechanisms. In other variations, the system and method can be used without any or significant changes to product packaging and printing processes.

2. System

Figure 1:
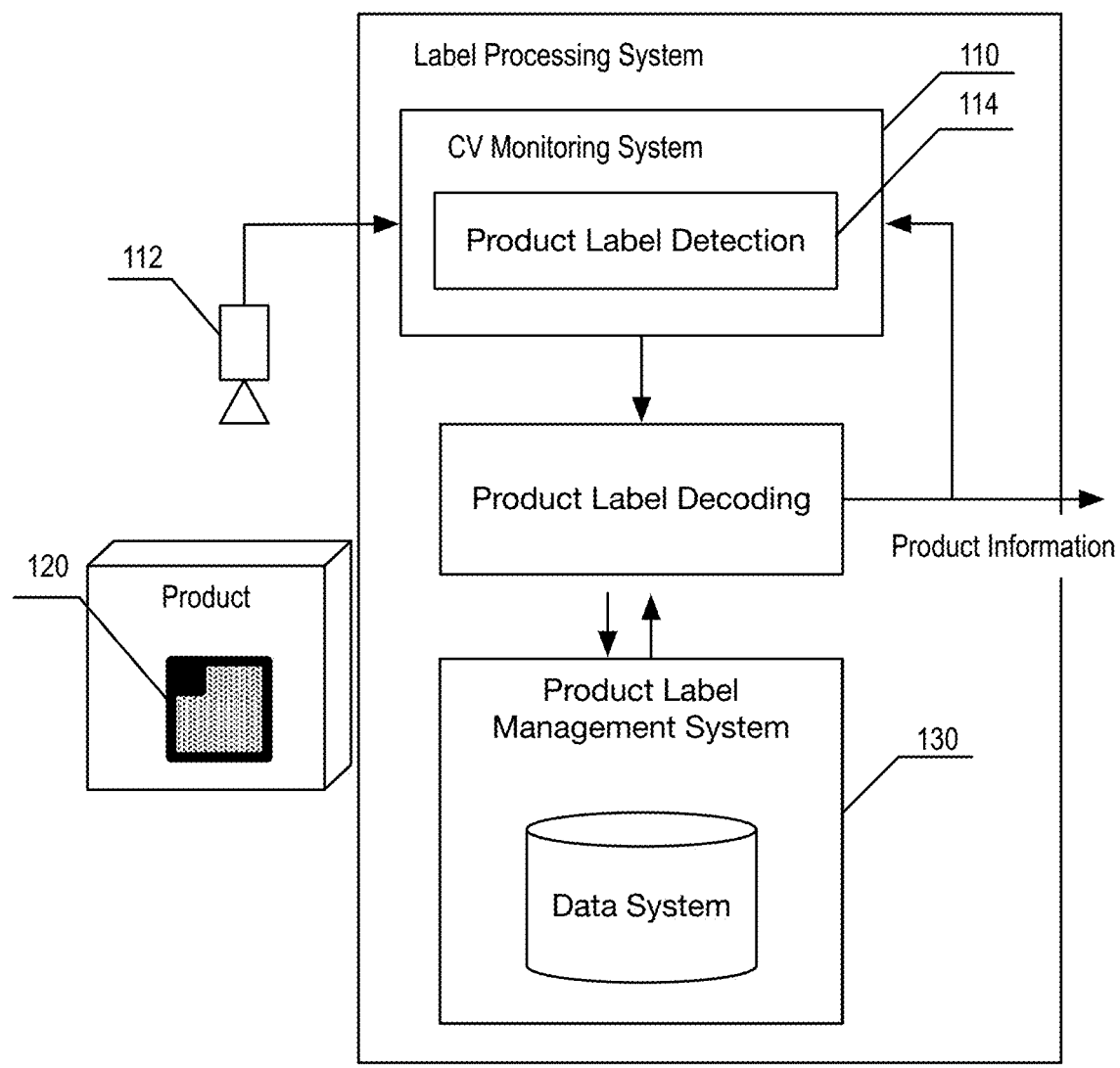
FIG. 1 is a schematic representation of a system.

As shown in FIG. 1, a system for universal product labeling for vision-based commerce can include a CV monitoring system 110 including at least one imaging system 112 and a product label detection module 114, and a product label no applied to a product. The CV monitoring system 110 is preferably configured to detect product labels and in some variations, facilitate translation of the image data of the product label into product identifier. The system may additionally include a product label management system 130 used for registration, tracking, assignment, and/or generation of product labels. The product label 110 is preferably one generated and produced to incorporate graphic properties as described herein. Various implementations of the system may include all or part of the components described herein, and/or may be combined or integrated with other compatible system components.

The system is preferably implemented where a large volume of differentiated product labels can be used within an environment. In this way, product identifiers such as a UPC, product descriptors (e.g., description of a made-to-order product) may be marked with the product labels.

Some select product label features of the system may include utilization of product labels using non-visible graphical representation, graphical signatures, contextually interpreted partial labels, group analysis of a product label, label patterns, and/or other product labels, which a specially configured CV monitoring system 110 in cooperation with various analysis and data systems can be used in identifying labels in challenging environments such as retail environments.

Non-visible product labels can be detected by imaging in non-visible portions of the light spectrum such as reading UV or IR labels.

Graphical signature labels can incorporate identifying information into the appearance of a product and made unique across at least a set of products.

Contextually interpreted partial labels may make reduce the amount of information to be encoded or represented by a graphical code such that individual components of the machine readable code may be better read. This may have particular applications in labeling items like made-to-order, custom products, and the like.

Group analysis of product labels may use groupings of product labels to facilitate labeling. This may have utility in identifying small products with little physical space for displaying a label readable from a distance. As a group, multiple segments of labels may be interpreted as a group to identify the items. In a similar manner label patterning may allow a repeated pattern to be applied across a surface for enhance readability for some products such as products which may not have an obvious side that would be displayed on a shelf.

The imaging system 112 may be modified for separate detection and reading of the product label in addition to general image capture. The system may be used in connection with another system. For example, the system may be used as part of an automated commerce monitoring system which may use the CV monitoring system 110 and/or other monitoring systems for facilitating one or more form of automation or tracking for commerce related operations.

While the system is described as it may be used for product labeling and identification, the system can alternatively be used for any suitable form of object labeling wherein labels and the reading of such labels can be used for reading information from marked items and/or objects in an environment.

The CV monitoring system 110 functions to visually monitor an environment and detect at least the product label 120. The CV monitoring system 110 can detect the presence of a product label 120 and interpret the information encoded in the product label 120, which in one preferred variation the encoded information is a product identifier but may alternatively be any suitable information. The CV monitoring system 110 may additionally associate the information extracted from a product label 120 with a CV identified object. The CV identified object can be the object on which or to which the product label 120 is applied such as a product. The CV identified object may alternatively be one contextually associated with the label. In the apple bin example above, the product label 120 may be applied to all the apples detected in some pre-configured adjacent proximity to the sign (e.g., below, next to, and/or above the sign).

A CV monitoring system 110 of a preferred embodiment functions to transform image data collected within the environment into observations relating in some way to items in the environment. In particular, the CV monitoring system 110 is configured for detection of product labels. In some variations, the CV monitoring system 110 may additionally be configured to perform additional processing operations that facilitate interpretation of a product label. In some variations, the CV monitoring system 110 may be configured to perform additional processing operations that make use of detected product label such as track product interactions, which may be used to facilitate automated checkout or other digitally tracked activities.

Preferably, the CV monitoring system 110 is used for detecting labels, detecting items, monitoring users, tracking user-item interactions, and/or making other conclusions based on image and/or sensor data. The CV monitoring system 110 will preferably include various computing elements used in processing image data collected by an imaging system 112. In particular, the CV monitoring system 110 will preferably include an imaging system 112 and a set of modeling processes and/or other processes to facilitate analysis of user actions, item state, and/or other properties of the environment.

The CV monitoring system 110 is preferably configured to detect and extract information from a set of physical labels 110 in the environment. The CV monitoring system 110 may additionally be configured to facilitate identifying of items and detection of interactions associated with identified items.

The CV monitoring system 110 preferably provides specific functionality that may be varied and customized for a variety of applications. In addition to item identification, the CV monitoring system 110 may additionally facilitate operations related to person identification, virtual cart generation, item interaction tracking, store mapping, and/or other CV-based observations. Preferably, the CV monitoring system 110 can at least partially provide: person detection; person identification; person tracking; object detection; object classification; object tracking; gesture, event, or interaction detection; detection of a set of customer-item interactions, and/or other forms of information.

In one preferred embodiment, the system can use a CV monitoring system 110 and processing system such as the one described in the published US Patent Application 2017/0323376 filed on May 9, 2017, which is hereby incorporated in its entirety by this reference. The CV monitoring system 110 will preferably include various computing elements used in processing image data collected by an imaging system 112.

The imaging system 112 functions to collect image data within the environment. The imaging system 112 preferably includes a set of image capture devices. The imaging system 112 might collect some combination of visual, infrared, depth-based, lidar, radar, sonar, and/or other types of image data. The imaging system 112 is preferably positioned at a range of distinct vantage points. However, in one variation, the imaging system 112 may include only a single image capture device. In one example, a small environment may only require a single camera to monitor a shelf of purchasable items. The image data is preferably video but can alternatively be a set of periodic static images. In one implementation, the imaging system 112 may collect image data from existing surveillance or video systems. The image capture devices may be permanently situated in fixed locations. Alternatively, some or all may be moved, panned, zoomed, or carried throughout the facility in order to acquire more varied perspective views. In one variation, a subset of imaging devices can be mobile cameras (e.g., wearable cameras or cameras of personal computing devices). For example, in one implementation, the system could operate partially or entirely using personal imaging devices worn by users in the environment (e.g., workers or customers).

The imaging system 112 preferably includes a set of static image devices mounted with an aerial view from the ceiling or overhead. The aerial view imaging devices preferably provide image data that observes at least the users in locations where they would interact with items. Preferably, the image data includes images of the items and users (e.g., customers or workers). While the system (and method) are described herein as they would be used to perform CV as it relates to a particular item and/or user, the system and method can preferably perform such functionality in parallel across multiple users and multiple locations in the environment. Therefore, the image data may collect image data that captures multiple items with simultaneous overlapping events. The imaging system 112 is preferably installed such that the image data covers the area of interest within the environment.

Herein, ubiquitous monitoring (or more specifically ubiquitous video monitoring) characterizes pervasive sensor monitoring across regions of interest in an environment. Ubiquitous monitoring will generally have a large coverage area that is preferably substantially continuous across the monitored portion of the environment. However, discontinuities of a region may be supported. Additionally, monitoring may monitor with a substantially uniform data resolution or at least with a resolution above a set threshold. In some variations, a CV monitoring system 110 may have an imaging system 112 with only partial coverage within the environment.

The CV monitoring system 110 can include a CV-base processing engine and data pipeline. A CV-based processing engine and data pipeline preferably manages the collected image data and facilitates processing of the image data to establish various conclusions. The various CV-based processing modules are preferably used in detecting labels, classifying items, generating user-item interaction events, a recorded history of user actions and behavior, and/or collecting other information within the environment. The data processing engine can reside local to the imaging system 112 or capture devices and/or an environment. The data processing engine may alternatively operate remotely in part or whole in a cloud-based computing platform.

Various techniques may be employed in such CV-based processes such as a "bag of features" object classification, convolutional neural networks (CNN), statistical machine learning, or other suitable approaches. Neural networks or CNNS such as Fast regional-CNN (r-CNN), Faster R-CNN, Mask R-CNN, and/or other neural network variations and implementations can be executed as computer vision driven object classification processes or models that when applied to image data can perform detection, classification, identification, segmentation, and/or other operations. Image feature extraction and classification and other processes may additionally use processes like visual words, constellation of feature classification, and bag-of-words classification processes. These and other classification techniques can include use of scale-invariant feature transform (SIFT), speeded up robust features (SURF), various feature extraction techniques, cascade classifiers, Naive-Bayes, support vector machines, and/or other suitable techniques. The CV monitoring and processing, other traditional computer vision techniques, deep learning models, machine learning, heuristic modeling, and/or other suitable techniques in processing the image data and/or other supplemental sources of data and inputs. The CV monitoring system may additionally use human-in-the-loop (HL) processing in evaluating image data in part or whole.

A product label detection model is preferably a computer vision model or processing module that applied to image data can be used in detecting and locating product labels in collected image data. A product label detection model may be integrated into an image data processing pipeline so that all readable instances of different product labels may be detected. Alternatively, product label detection may be used for select image data depending on the configuration and application of the system.

The item detection module 114 of a preferred embodiment, functions to detect and apply an identifier to an object. The item detection module 114 preferably performs a combination of object detection, segmentation, classification, and/or identification. This is preferably used in identifying products or items displayed in a store. Preferably, a product can be classified and associated with a product SKU identifier. In some cases, a product may be classified as a general type of product. For example, a carton of milk may be labeled as milk without specifically identifying the SKU of that particular carton of milk. An object tracking module could similarly be used to track items through the store.

In a successfully trained scenario, the item detection module properly identifies a product observed in the image data as being associated with a particular product identifier. In that case, the CV monitoring system 110 and/or other system elements can proceed with normal processing of the item information. In an unsuccessful scenario (i.e., an exception scenario), the item detection module fails to fully identify a product observed in the image data. An exception may be caused by an inability to identify an object but could also be other scenarios such as identifying at least two potential identifiers for an item with sufficiently close accuracy, identifying an item with a confidence below a certain threshold, and/or any suitable condition whereby a remote item labeling task could be beneficial. In this case the relevant image data is preferably marked for labeling and/or transferred a product mapping tool for human assisted identification.

In some variations, interpretation of product labels may make use item identification, where the item identification of a product partially identifies, classifies, or generates a descriptor. For example, item identification (or in this case item "classification") may detect descriptive attributes of a product. This may be used to detect a "cereal box" object. When this information is combined with detection of a partially identifying product label, the system may be able to fully identify the product as a specific product SKU.

Other processing modules may additionally be included, which may be used for other operations of the CV monitoring system 110 to assist in tasks such as maintaining a virtual cart of a user during an automated checkout experience. Some exemplary CV processing modules are described herein, but the system is not limited to these processes.

User-item interaction processing modules function to detect or classify scenarios of users interacting with an item (or performing some gesture interaction in general). User-item interaction processing modules may be configured to detect particular interactions through other processing modules. For example, tracking the relative position of a user and item can be used to trigger events when a user is in proximity to an item but then starts to move away. Specialized user-item interaction processing modules may classify particular interactions such as detecting item grabbing or detecting item placement in a cart. User-item interaction detection may be used as one potential trigger for an item detection module.

A person detection and/or tracking module functions to detect people and track them through the environment.

A person identification module can be a similar module that may be used to uniquely identify a person. This can use biometric identification. Alternatively, the person identification module may use Bluetooth beaconing, computing device signature detection, computing device location tracking, and/or other techniques to facilitate the identification of a person. Identifying a person preferably enable customer history, settings, and preferences to be associated with a person. A person identification module may additionally be used in detecting an associated user record or account. In the case where a user record or account is associated or otherwise linked with an application instance or a communication endpoint (e.g., a messaging username or a phone number), then the system could communicate with the user through a personal communication channel (e.g., within an app or through text messages).

A gesture, event, or interaction detection modules function to detect various scenarios involving a customer. One preferred type of interaction detection could be a customer attention tracking module that functions to detect and interpret customer attention. This is preferably used to detect if, and optionally where, a customer directs attention. This can be used to detect if a customer glanced in the direction of an item or even if the item was specifically viewed. A location property that identifies a focus, point, or region of the interaction may be associated with a gesture or interaction. The location property is preferably 3D or shelf location "receiving" the interaction. An environment location property on the other hand may identify the position in the environment where a user or agent performed the gesture or interaction.

Alternative forms of CV-based processing modules may additionally be used such as customer sentiment analysis, clothing analysis, customer grouping detection (e.g., detecting families, couples, friends or other groups of customers that are visiting the store as a group), and/or the like. The system may include a number of subsystems that provide higher-level analysis of the image data and/or provide other environmental information such as a real-time virtual cart system.

In some variations, a real-time virtual cart system may be integrated into the operation of the CV monitoring system 110. The real-time virtual cart system functions to model the items currently selected for purchase by a customer. The virtual cart system may enable automatic self-checkout or accelerated checkout. Product transactions could even be reduced to per-item transactions (purchases or returns based on the selection or de-selection of an item for purchase).

In some variations, the imaging devices of the CV monitoring system 110 may be modified to collect image data capable of detecting the product label 120. In some variations, the imaging devices include infrared or ultraviolet image sensors and/or capabilities. In some variations, notch filters, multi-layer optical coatings, and/or other optical subsystems may be used to monitor specific frequencies or ranges of the spectrum.

The imaging devices may additionally include illumination systems, which may include IR, UV, visual light, and/or other forms of illumination. The illumination systems may be general, flood illumination systems, which may be constantly on and/or selectively activated. The illumination systems may alternatively be structured or controlled for spatially interrogating a field of view.

In one variation, the illumination systems could pulse. More specifically, the illumination system can include a UV or IR emitter that pulses at a constant frequency or range of frequencies, which may function to improve signal to noise ratio by looking for reflections in sync with the emitter. This may serve to eliminate interference from other sources that may be emitting in the steady state like sunlight, hot objects, and the like. This may work for variations where the ink reflects the illumination or absorbs and re-emits it as visible light.

In another variation, a dye like fluorescin may be used in producing the product labels 120, where the dye absorbs and emits within the visible spectrum. The imaging devices can be monitor the absorption and emission at the appropriate wavelengths to distinguish patterns and reject noise to better detect and read a product label 120.

The imaging devices can be dual purpose in that they can collect image data for other CV-based or surveillance applications in addition to product label 120 detection/identification. The imaging devices may alternatively be single purpose in that they function primarily or exclusively for remote detection and identification of product labels 120. Such devices may be used to replace barcode readers at POS stations.

The product label 120 functions as a graphical identifier. The product label 120 is preferably a printed label that can be applied to product packaging. The product label 120 for some objects may alternatively be implemented as a tag that can be attached to a product. In some other variations, the product label 120 may be a digitally displayed label using a digital display screen. The product label 120 may alternatively be implemented as labeled signage that is not directly applied or attached to an associated item but is positioned in a contextually associated position. For example, a sign identifying a bin of apples to customers may have a PLU (price look-up) code of the apples transparently also printed with the sign. As discussed below, the system may make use of one or more variations of a product label 120.

The product label 120 can include a graphical machined readable code that encodes some data or value. In some variations the product label may encode specific types of information. In other variations, the product label 120 may encode a code that represents or refers to some information. In some cases, the encoded data is a reference that can be used to access a data record stored in a data system (e.g., a database maintained by the product label management system 130). In some cases, the encoded data is insufficient to uniquely identify a data record, and additionally information related to the detection of the product label is used in accessing.

In one implementation, a product label may be unique to a local classification group. The classification group can be used to reduce the space in which a code must be unique and thereby make the visual complexity and size of the label enhanced for readability by the CV monitoring system 110.

Graphical machine readable codes may be linear or multi-dimensional (e.g., linear or two dimensional "barcodes"). Graphical codes may work on binary-state graphics or non-binary-state graphics (e.g., encoding with use of multiple hues, intensities, etc.). Graphical codes in some variations can be error-correcting and/or redundant. They may additionally include graphical features to represent or facilitate dealing with code version information, format information, position/alignment, parity, and/or other information.

Figure 3:
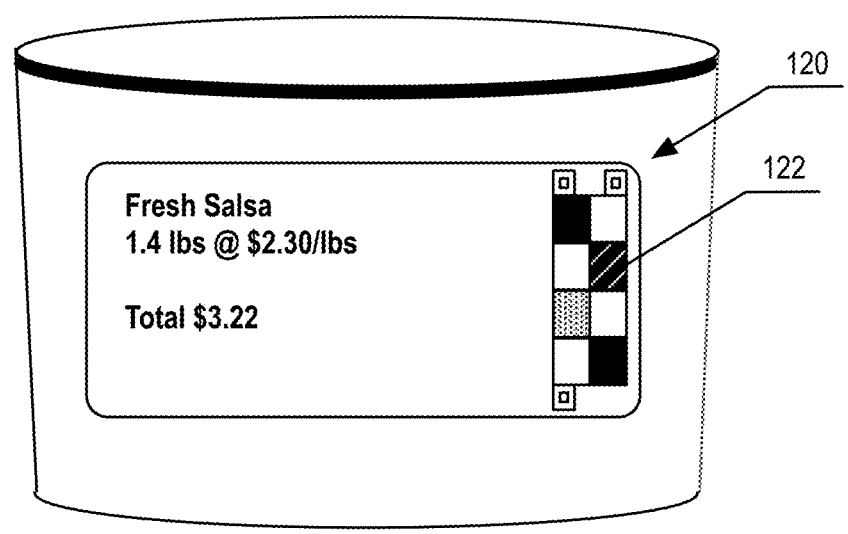
FIG. 3 is an exemplary representation of a product label using a graphical code calibrated with graphical data elements sized for distance reading.

In one exemplary variation, the graphical code may mirror a linear barcode like a UPC code. In another exemplary variation, the graphical code may mirror a 2D graphical code like a QR code. The graphical code, in some variations, may mirror or incorporate features from other types of graphical codes such as Aztex Codes, BEEtags, Bokodes, Code 1 codes, cryptograms, dataglyphs, data matrixes, DotCodes, high capacity color barcodes, MaxiCodes, JAB-Codes, and/or any suitable type of machine-readable graphical codes. In other variations, such as in the low vocabulary/high readability graphical codes described as being used with partial product labels, the graphical codes may utilize unique encoding protocol so as to increase the graphical data element detectability such as shown in FIG. 3.

One variation of a graphical machine-readable code of a product label 120 includes a graphical arrangement of graphical data elements 122 in different states. Graphical data elements 122 can be the graphical "bits" used in encoding information, their state, patterns, and arrangement can be used in encoding information.

In some variations, the graphical code may use graphical data elements 122 that are of sufficiently large enough size so as to be detected and distinguished by an imaging device that is many feet away (e.g., greater than 9 feet). In one example, the graphical data element 122 may have a size greater than one centimeter in one dimension. As shown in FIG. 3, this may be used so as to keep a product label a reasonable size that can be placed as an adhesive sticker on a custom labeled product. This is provided as an example, and various properties of the product label 120 and/or detection of the product label 120 may be adjusted based on different requirements.

Use of partial product labels or encoding smaller amounts of data can enable the graphical data elements 122 to be increased in size while keeping the footprint of the graphical code within target dimensions. In some implementations, only tens or hundreds of thousands of pixel image data of a product label can be sufficient to interpret the product label.

In one variation, the graphical data elements 122 have binary state (e.g., black and white). In other variations, the graphical data elements 122 may be multistate such as having tertiary state (three different colors) or more states. In one variation, the number of states could be 14 using 3 brightness levels of 4 colors (e.g., 12 different color values) and including black and white. Hue, saturation, brightness/shade, size, shape, arrangement, and/or other variables may be used. Some variations may use a graphical code with a limited number of graphical code elements 122 to minimize overall size and impact to packaging. In one example, a graphical code may include 4 to 16 graphical data elements 122 though any suitable number may be used.

The product labels 120 may make use of one or more different graphical codes that are manifested in a substantially visually-transparent medium such as UV or IR reflective printing, masking by a dominant visual graphics, and/or other techniques described herein.

In place of a graphical code, some variations may use a product label 120 that is identifying through a graphical signature. A graphical signature may not be a defined graphical pattern, but some patterns incorporated into a label that can be identifying. For example, a histogram based graphical signature may use color patterns present in the packaging of a product to identify a particular produce. As described below. The product label management system 130 may facilitate management and control of such identifying graphical signatures to prevent conflicts.

The product label management system 130 functions as a computer-implemented platform that may facilitate administration of such product labels 120. Some variations of the system may make use of the product label management system 130 in the generation and assignment of product labels 120. Some variations are discussed below. Other variations may operate independent from a product label management system 130 and therefor may not include or need such a management system.

The product label management system 130 may store, maintain or access one or more data systems in tracking product label associated information. This may be particularly useful for partial product labels, where the product label encodes only partial information, and the information can be used in retrieving full product information.

As discussed below, the system may make use of one or more variations of a product label 120 and/or CV monitoring system 110.

As one preferred variation, the system is configured to use product labels 120 using non-visible graphics, where non-visible characterizes graphical presentation of a label in a format and/or medium that is not directly detectable by a human.

Figure 4:
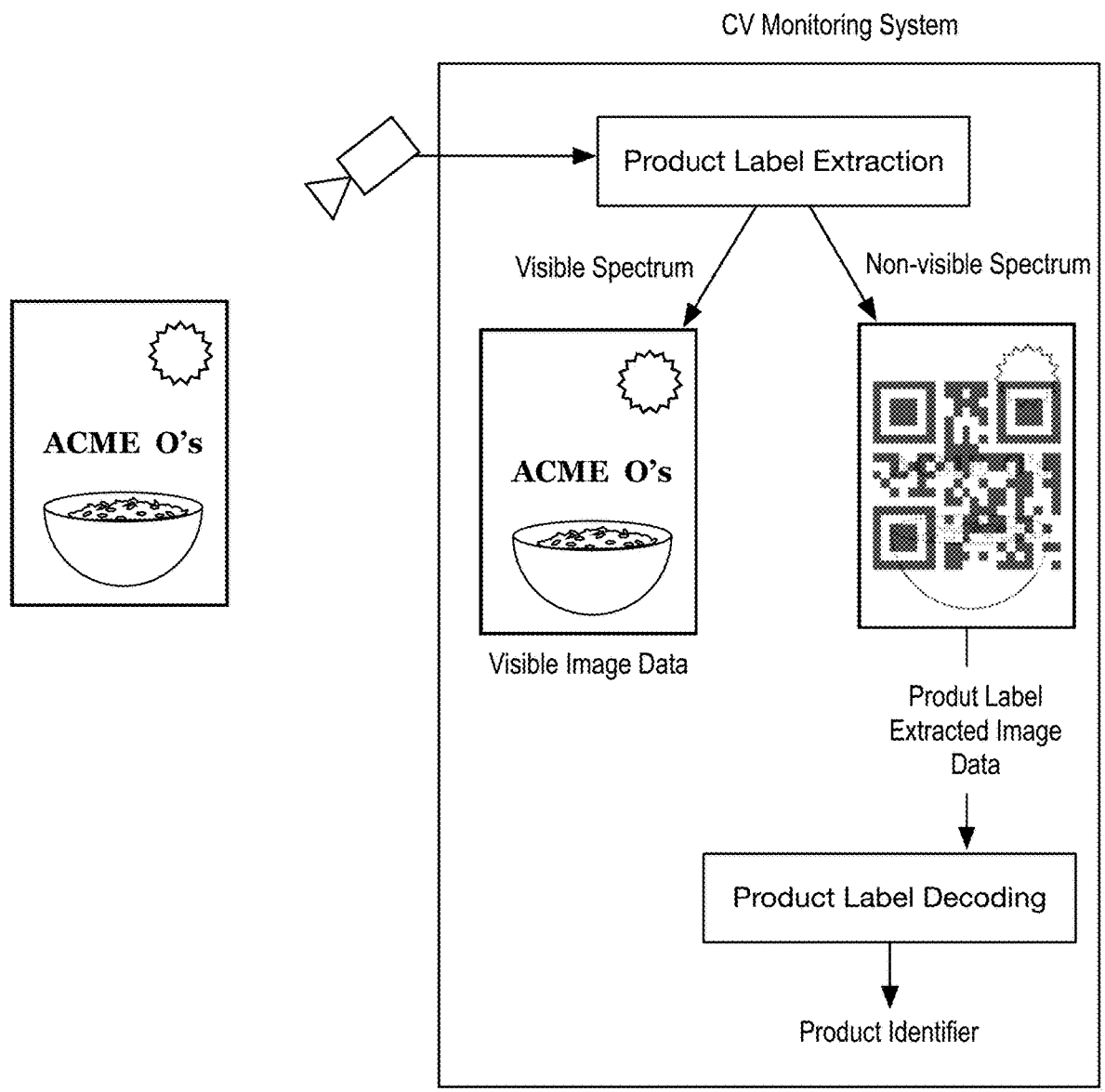
FIG. 4 is a schematic representation of a system with non-visible product labels.

As shown in a variation of FIG. 4, the non-visible graphics may be represented using dyes outside of the visible spectrum such as IR (infrared) or UV (ultraviolet) inks. Non-visible spectrum dyes preferably absorb exclusively or at least partially in a non-visible portion of the light spectrum. For example, non-visible spectrum dyes may include IR-absorbing dyes and/or UV-absorbing dyes. Dyes usable in near IR (NIR) or other suitable portions of the light spectrum may alternatively be used. In one variation, the ink could be fluorescent. Non-visible spectrum inks are preferably invisible/transparent, though presence may be minimally detected on close visual inspection from a few feet or using a microscope. The non-visible spectrum dyes are preferably incorporated into the graphical production of packaging of a product such that the product label 120 can be overlaid or otherwise integrated into the graphics of a product or product packaging.

The CV monitoring system 110 in this variation preferably includes an image sensor with sensing in the non-visible spectrum. The imaging device may include an IR image sensor, UV image sensor, and/or any suitable sensor for the non-visible spectrum of the non-visible spectrum dye. In one implementation, a visual image sensor is modified to include IR image sensing as an additional channel to the visible spectrum sensing. For example, the sensor array of a camera sensor may have a filter pattern that incorporates an IR filter in addition to other visible spectrums. For example, a modified Bayer filter mosaic (i.e., a type of color filter array) may incorporate a mosaic pattern of red, green, blue, and IR pixel filters. The pattern and density of the IR pixels may be calibrated based on desired resolution capabilities of the camera. In another variation, an image sensor operating in the non-visible spectrum (e.g., IR or UV image sensor) may be used in parallel to a visual imaging device. In some variations, the system may include only an image sensor operating in the non-visible spectrum.

In operation, the use of a non-visible graphic using non-visible spectrum dyes may include extracting the image data for the non-visible spectrum and processing that image which can include detecting presence of one or more instances of a code and/or decoding each instance of a code.

As another variation, a similar implementation of the product labeling may use light reflective or absorbing ink or surface treatment, which functions to alter the reflectance of a surface. In this variation, a visible flash controlled by the CV monitoring system 110 may be used to illuminate the surrounding environment. The patterns of light reflectance or absorption inks can be printed with an associated graphical code on the surface of a product. For example, a graphical code may be printed on the face of a product box using glossy and/or matte ink or surface treatment.

Figure 5:
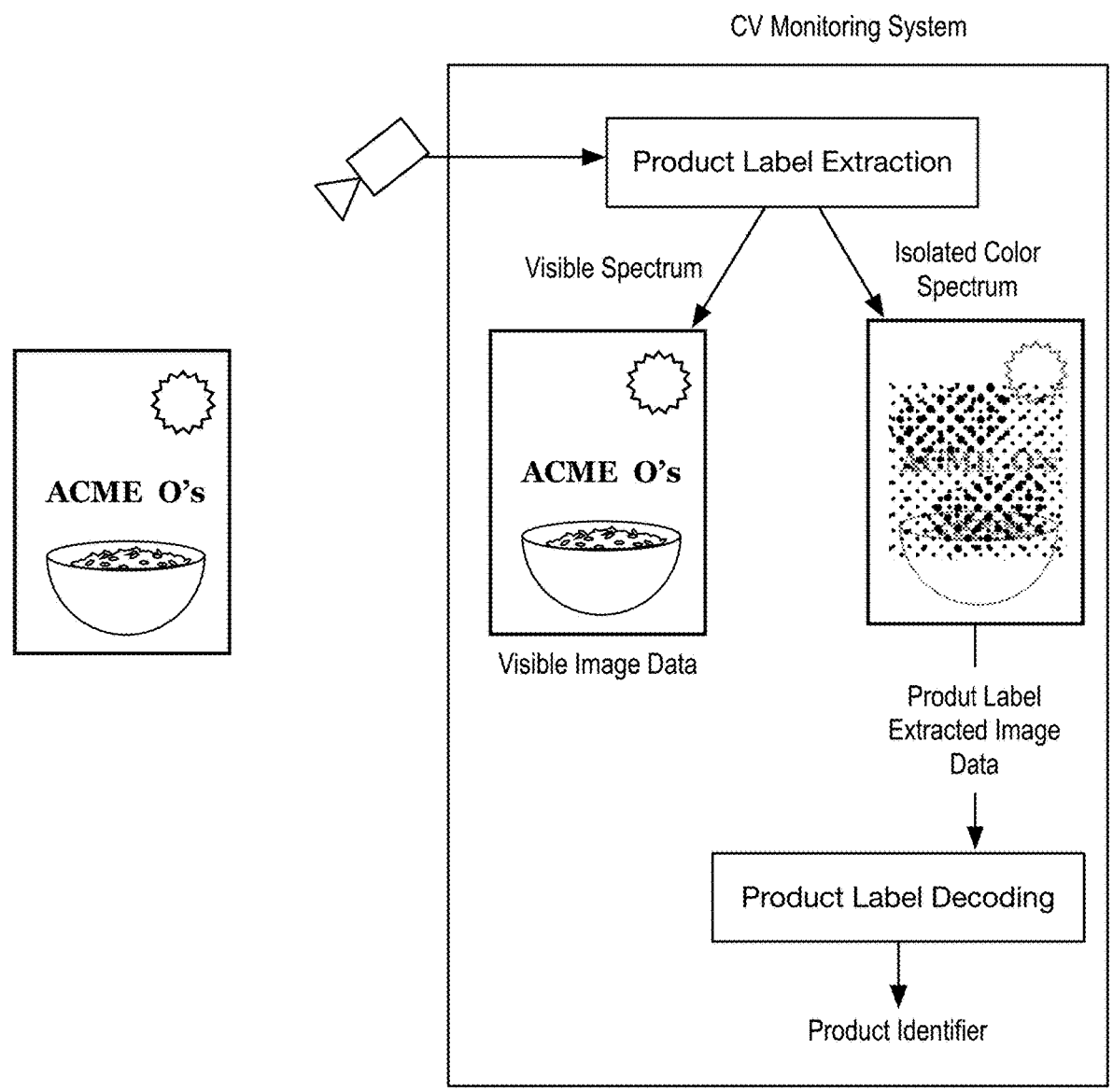
FIG. 5 is a schematic representation of a system with non-visibly masked graphical codes.

As shown in variation of FIG. 5, the system may alternatively be configured to use product labels 120 using visually masked graphical codes, where the graphical code is cloaked or hidden within a human-targeted visual representation. A visually masked graphical code of one variation may communicate a graphical code in a limited color spectrum, and the CV monitoring system 110 is preferably configured to specifically extract and analyze that portion of the spectrum for a graphical code. In this variation, visible spectrum dyes may be used in producing the product label 120. This variation may embed the identifying traits, patterns, or properties of the product label into all or part of the product packaging.

In one variation, the color channel in which the graphical code is represented may be consistent across all product labels 120. In another variation, there may be a number of possible color channels from which a product may select based on which is appropriate—each channel may be individually checked. For example, a product with red-dominant packaging may have a subtly integrated graphical code represented in blue. In another variation, the product label 120 is represented in a portion of the visible spectrum that is conditionally determined. For example, the general color and/or appearance of a product may determine the color channel in which the graphical code is represented. This may function to work across the wide variety of product packaging designs that may be used. In this variation, an object may be detected, the object analyzed to determine the associated product label color channel (or range of channels) and then inspecting those color channels in the image data for a graphical code of the product label 120.

In a related variation, a graphical code could leverage other color channel dimensions for representing a graphical code. In some ways, the graphical code may be represented as an invisible watermark detectable when viewed by an image sensor.

The CV monitoring system 110 may use standard visual-spectrum imaging device may be used in such color-mask variations. The imaging device may alternatively include custom color filters that are specifically selected for the color channels in which a graphical code may be represented.

In operation, the use of a color masked representation of product labels 120 may include the CV monitoring system 110 extracting the image data for one or more color channel and processing the one or more images of the color channels, which can include detecting presence of one or more instances of a code and/or decoding each instance of a code.

Figure 6:
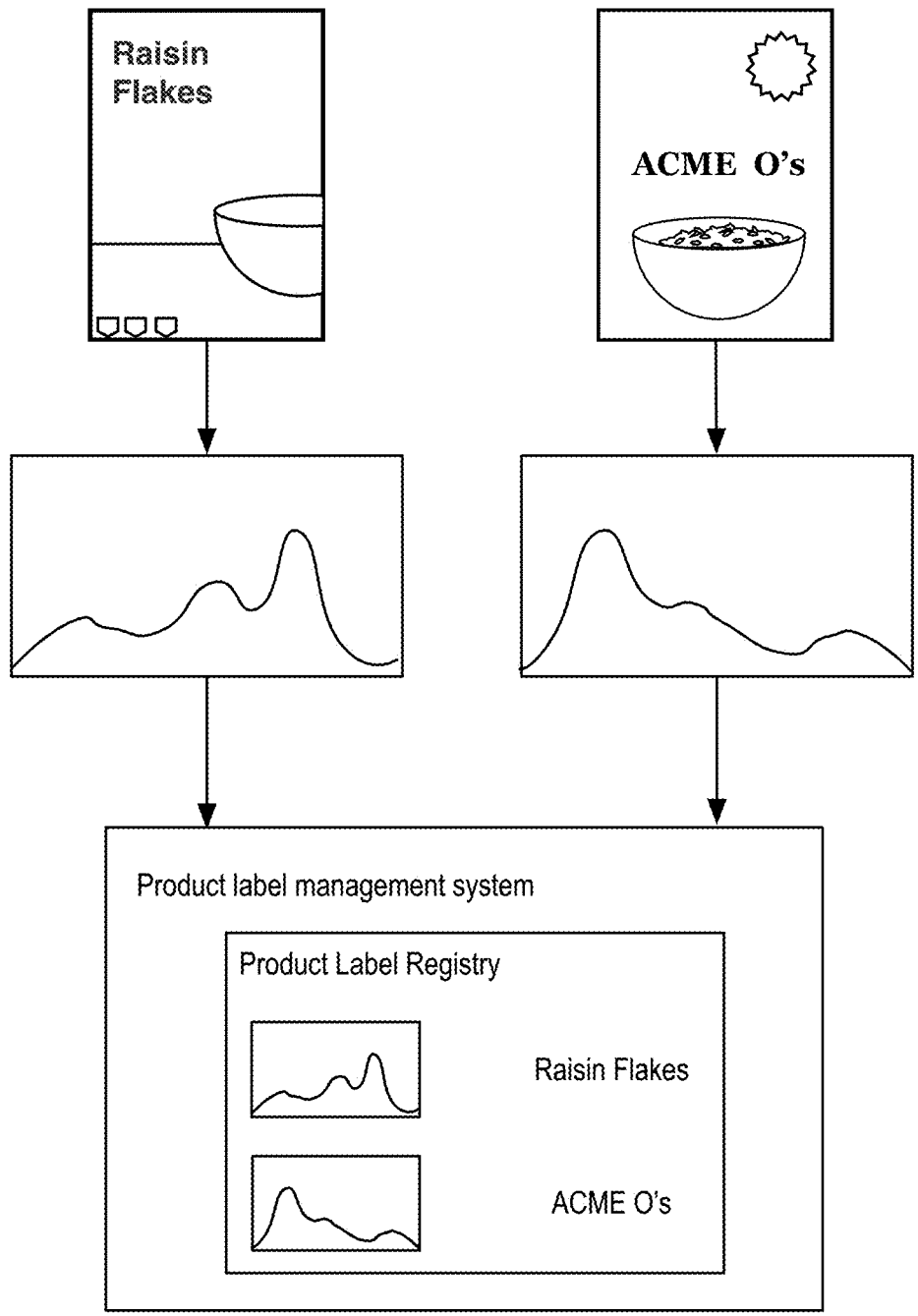
FIG. 6 is a schematic representation of a system with graphical signature labels.

As shown in variation of FIG. 6, the product label 120 may be implemented through management of the graphical signature of a product packaging visuals. In this variation, the actual visual graphics of a product are directly used. A product label management system 130 is preferably used in regulating and enforcing compliance of product packaging.

In one simple exemplary implementation, the color histogram of the visuals of product packaging may be regulated such that the color histograms of two products do not collide. The visual signature may be regulated to be globally unique but may alternatively be made unique within some limited group (e.g., within a product category). The color histogram variation may use RGB (red, green, blue), CMYK (cyan, magenta, yellow, and black), HSV (hue, saturation, brightness/value), and/or any suitable color space. More generally, the visual signature may use any suitable number of visible dimensions used in characterizing image data. For example, texture, edges detection, general CV classifications (e.g., typographic packaging, graphical packaging, etc.), and/or other properties can be used in determining a product label's image space signature.

Product visual signatures (as determined by product packaging) may be regulated in connection with general distinguishing traits such as packaging type, dimensions, product categories, and/or other properties. For example, a visual signature of a large product box (e.g., a cereal box) may be regulated independent of the visual signatures of small format items (e.g., canned food).

A visual signature may be registered and generalized for a range of visual differences, which may enable product packaging to make various changes. Additionally, the visual signature may have variable dimension defined within specific dimensions of the visual signature. For example, a black channel in a CMYK-based histogram may be allowed to change within a wide range such that black text can change and adjusted without interfering with the visual signature.

In a related variation, a product label 120 may be derived from a source graphic to form a CV model-based product label. A CV model-based product label encodes a graphical signature into a resulting graphic that functions as the visually perceived image as well as the product label 120. The identifying characteristics of the product label are preferably subtle or perceived as noise to a human but readily distinguished by a trained AI model and/or an imaging device. A CV model-based product label may be generated by analyzing an input graphic to determine graphical modifications to enhance CV model identification. The graphical modifications are then applied by augmenting or perturbing the input graphic. In some variations, this may include generation of an adversarial patch that when applied to a portion of the input graphic biases CV classification/identification of the product for the product identifier. In another variation, an adversarial mask can be generated that modifies the input graphic so that it is visually perceived consistent with the input graphic, but is biased for identification with the product label information by a CV model.

In another variation, a partial product label 120 may be used where the partial product label provides only partially identifying information. A partial product label preferably uses a graphical code using a reduced code vocabulary. In one example, the graphical code may have a code language of one million codes, one hundred thousand codes, or less than ten thousand codes. Partial product labels may be used to convey partial information such as some product metric like weight, count, size, price, and/or any suitable metric, which when combined with, for example, a CV-detected product SKU identity can be used to resolve a product line item (used in a checkout transaction). Partial product labels may encode data associated with a local classification group. Partial product labels may be used in combination with other contextual information to access stored product identifier information. The contextual information may identify a corresponding classification group. For example, a product identifier may be accessed from a database with a query based on the location of a product label (e.g., at the meat counter) and the encoded information of the product label.

The contextual information is preferably based on collected image data. Other examples of contextual information may include classification of product properties (e.g., packaging type, color, size, general product classifications, etc.), and/or contextual classification visual identifiers (e.g., another graphical code or identifier used to mark a location in a store).

In one partial label variation, a partial product label 120 may augment or supplement CV-based identification of a product. The product label 120 may provide supplemental information that can be used to refine product identification. The product label format or medium may be any of the variations discussed herein. However, in this variation, instead of encoding the full product identifier, the product label 120 may supply partial information that is used in combination with CV-based analysis. For example, this variation may be used in distinguishing flavor variations of a line of similarly packaged products. For example, coffee bag flavors may have a product label 120 that communicates 4-bits of information to identify 8 possible flavors after general CV classification of a product as being that brand of coffee. In another specific example, the partial product label 120 may be used to encode product information metrics such as weight, size, count, expiration date, price, and/or other information that may be paired with a product type identifier in more fully specifying the product information as shown in FIG. 2. This functions to allow the size of information communicated product label 120 to be significantly lower so that the product labels 120 may be larger and/or more easily read.

In one possible variation, the product label 120 may be implemented through a color code wherein the identity of a product is signal through one or possible a small set of colors. The color code variation of a product label 120 preferably includes a calibration marker and at least one identifying color marker. The calibration marker and identifying color marker may be arranged into a CV detectable graphic. Alternatively, the identifying color marker may be integrated into the design of the packaging such as using it as the dominant color of the front face of the packaging. The calibration marker is preferably a color or set of colors that is printed to some standard color. The calibration marker functions as a relative calibration point. The calibration marker will preferably include color values distributed across the color space (e.g., Red, Green and Blue). The identifying color marker can include one or more color graphics. The identifying color marker can be compared relative to the calibration marker to determine its value. This relative comparison can correct for printing variations of the product, lighting variations in the store, camera color sensing variations of the monitoring system.

Figure 7:
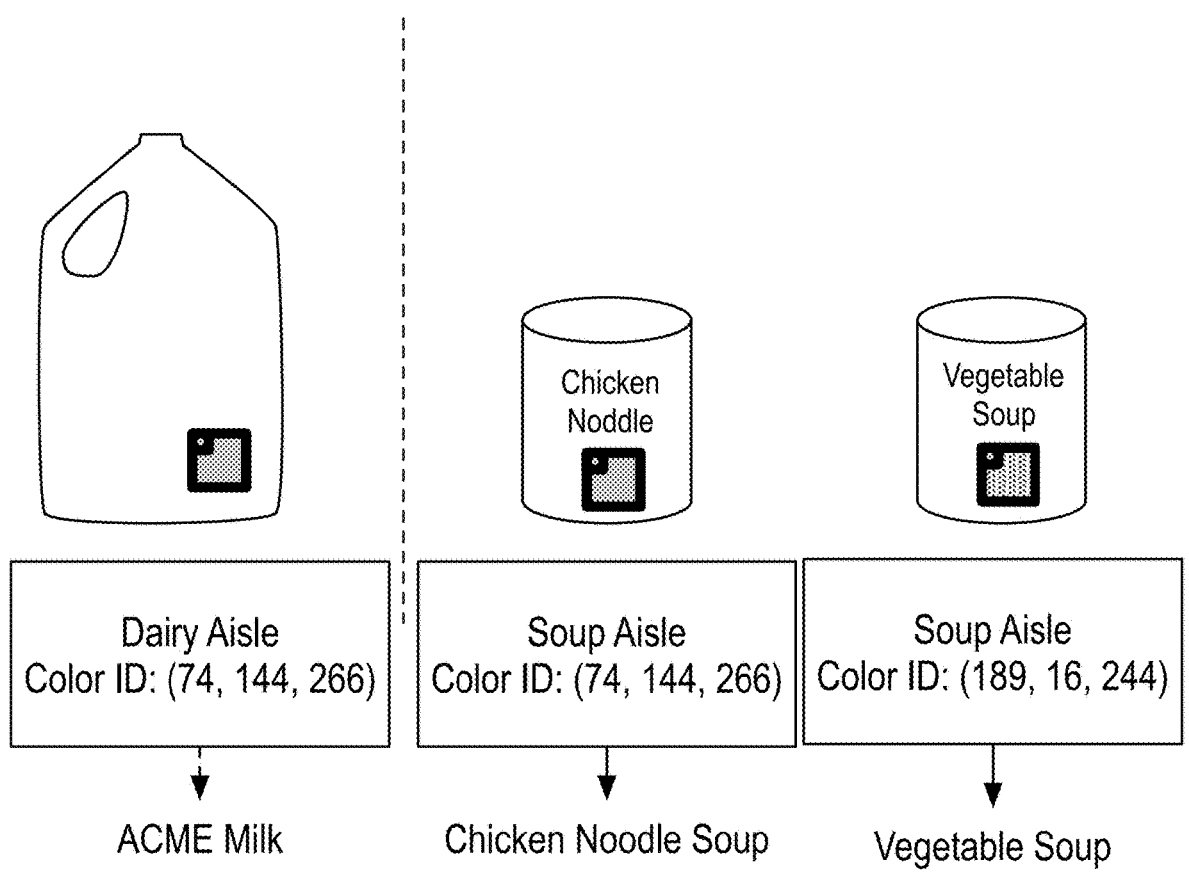
FIG. 7 is a schematic representation of a system using a color code variation.

A partial product label 120 such as a low vocabulary product label or an identifying marker can be unique for a local classification group. In this way, the identifying marker combined with one or more attribute of the product can be used to identify the product. In some variations, the product label management system 130 may store data records in a data system that manage the association between a partial product label 120 and associated information. The encoded information (the partial product identifier) in a partial product label 120 may be unique within the scope of the local classification group. Product type, type of packaging, aisle location, and/or other attributes can be used to limit the scope so a product can be uniquely identified within a store. For example, a carton of milk may have the same identifying marker as a can of soup because the location or product type can be used to differentiate. However, two soups that may be stocked near each other can be assigned distinct identifying markers as shown in FIG. 7. A product label management system 130 can preferably facilitate keeping registered identifying markers sufficiently separated from similar products.

The product labels 120 of one variation are applied to the product packaging, which may include a box, a sticker or attached label, a bag, and/or the surface of the product itself. The product label 120 is preferably at least applied to the front face of the product. As there may be a variety of ways in which a product is stored or displayed, the product label 120 may be repeated on multiple faces and/or sides of a product. For example, a box may have the product label 120 applied on each face of the box. In one preferred variation, the label may be applied on the top face of a product, which may be more viewable by aerially mounted cameras in a store.

The product label 120 may use large portions of the product packaging in representing the product label 120. Since the product label 120 preferably does not interfere with the user-directed visuals, the product label 120 may even use the entire face/surface of product packaging. Larger product labels 120 may be easier to identify. However, in some variations, some standard sizes may be used where it is applied in some visible portion of a product.

Figure 8:
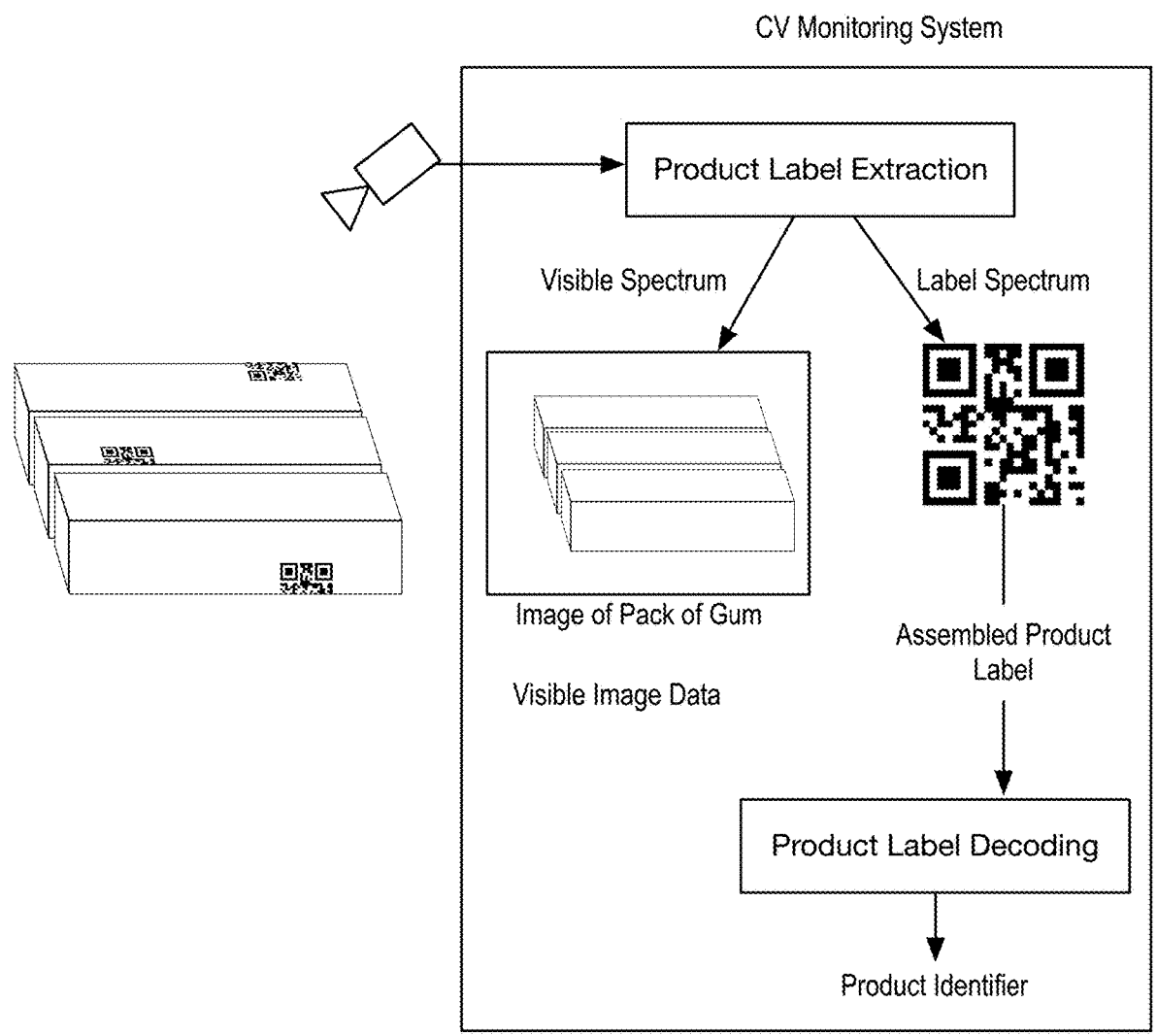
FIG. 8 is a schematic representation of using multiple instances of partial product labels to determine a product label.

As shown in FIG. 8, the product label 120 may additionally be applied as a repeated pattern across the surface of product packaging. This may increase the chances that the product label 120 is visible. For deformable products, such as chip bags, the visible portion of the product packaging may vary and so having multiple instances of the product label 120 may increase the likelihood that one is readable. As a variation to patterning the product label 120, the pattern may be non-uniform across at least a subset of product instances. In other words, the positioning, scale, and/or orientation of the product label 120 can vary between two or more instances of the same product. This variability/randomness of product labeling may function to make the product labels 120 resilient to different conditions for how a product label 120 is read. For example, the use of product display arrangement, camera placement, packaging deformations.

For small products it may also help enable collaborative identification of a product label 120 by identifying individual parts of a product label 120 visible from multiple instances of a product as shown in FIG. 8. In one variation, non-uniform patterning of a product label 120 can be used for identifying a product over multiple product instances visible at the same time. For example, the product identifier of a pack of a small bottle may be identified by collectively seeing enough portions of the product label 120 from the stack of bottles on a shelf. In another variation, non-uniform patterning of a product label 120 can be used for identifying a product over multiple time occurrences (in the same or spatially proximate location at the same shelf location or within 1-2 shelf space locations). For example, the product identifier associated with a pack of gum may be determined over time after seeing multiple instances of a pack of gum in the same location with a different subcomponent of the product label 120.

In some variations, the system may include a product label management system 130 that functions to facilitate generation, regulation, and registration of the product labels. The product label management system 130 is preferably a central resource that is used in managing the association of a product label 120 with a particular product. Some product label variations directly encode and convey the necessary information, which may be used without such a product label management system 130. However, some product label variations such as the graphical signature product labels, where the product label 120 is determined from the visual characteristics of the product packaging, may use the product label management system 130.

The product label management system 130 in some variations may provide feedback on a supplied input graphic. In this variation, a feedback tool can evaluate an input graphic and determine if the input graphic meets necessary conditions to be registered and/or identify issues with the input graphic. This may be implemented as an analysis process that can be performed locally on computing device or integrated into operation of some application as a feedback tool. For example, a tool may be enabled that monitors the current visual design of a digital graphic resource (e.g., product packaging design file), and provides feedback. The feedback may indicate if it has a product label conflict or issue. For example, it may show a green checkmark when the product label 120 is sufficiently unique for registration and a red x-mark when the product label 120 conflicts with a previously registered product label 120. The feedback may additionally provide feedback as to what aspects result in a conflict. As a simple example, the feedback tool may show a warning that the level of yellow is a contributor to the conflict. The feedback may additionally suggest changes. In one variation, it may even allow the tool to directly make the changes, which can result in color adjustment, repositioning and adjusting size of graphical elements, introducing patterns, introducing gradients, introducing textures, and/or making other suitable changes.

The product label management system 130 preferably tracks coverage of product labels to prevent collisions and overlaps of product labels. The product label management system 130 can allow brands, manufacturers, and/or other entities to register visual space territory that defines a product label 120. By enabling registration of a visual space, the signature may be allowed to vary in certain ways, which may be valuable in allowing packaging to be slightly modified. For example, a type of cereal may have registration for their base packaging design but then have flexibility of adding small variations and graphical elements as long as they keep within the registered visual space of their product label 120.

This registration can also be used to determine the associated product identifier or other information to associate with the labeled object. The CV monitoring system 110 will preferably detect a product label (e.g., a partial label or a visual signature) and then query the product label management system 130 for a product identifier or information corresponding to that signature.

Other ways of registering and regulating product labels may additionally be used. In a simpler approach a product label management system 130 maintains the association of some product identifier to product information. In variations where a product label 120 only partially defines a product identifier, the product label management system 130 may serve as a query interface for identifying the most likely product identifier for a set of input parameters. For example, the product label management system 130 may take a query input containing an expected product category of "cereal" or "breakfast food" (based on nearby items in that region of the environment), the dominant color of the product of "yellow", the packaging type of "large box", and the partial product label of "4J87", and then determine the product matching this query is "ACME Breakfast O's".

In one variation, the product label 120 may encode information for a URI or URL, which may be used for product identification as well as delivery of digital media. In this variation, the product label 120 can still be used as described herein but may also be made readable and usable by consumer devices such as a smart phone or a smart wearable or other suitable device. Preferably, when the monitoring system reads the product label the encoded URI includes a product identifier, which can be used by the monitoring system. However, that URI may also have web content or redirect to any suitable URI (e.g., webpage or an app). A product label management system 130 used to managed and assign codes may further manage the URI redirection configuration for a product. The account or entity that manages the registration with the product label management system 130 may provide an interface whereby the destination URI can be controlled. Alternatively, a destination URI may be pre-fixed for a given product label and even embedded into the encoded information of the product label.

3. Method

Figure 9:
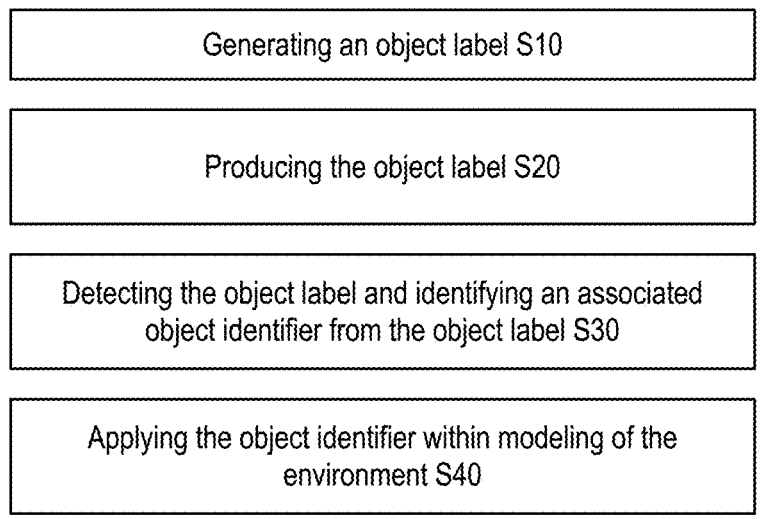
FIG. 9 is a flowchart representation of a method.

As shown in FIG. 9, a method for universal object labeling for vision-based commerce can include a first stage of generating an object label S10 and producing the object label S20, and a second stage of detecting the object label and identifying an associated object identifier from the object label S30. In some variations, the second stage may further include applying the object identifier within modeling of the environment S40.

The first and second stages may be performed together as a single method by a single entity. However, the first and second stages may alternatively be performed as individual methods by different entities. Some method variations may alternatively include generating the object label S110 performed independent of the other processes. Some method variations may alternatively include, independent of the other processes, detecting the object label and identifying an associated object identifier from the object label.

The method is preferably applied to product labeling and is described herein as such herein, however the method is not limited to labeling of products and the method may be used with any suitable type of product label.

The method is preferably implemented by a system such as the one described above, and the product label, CV monitoring, and/or other system variations above may be incorporated into the method. The method may alternatively be implemented by any suitable system.

The method may include various processes and features. Some exemplary implementations are presented herein along with more detailed description of some process variations. The method may incorporate any suitable combination of the implementations and variations.

Figure 10:
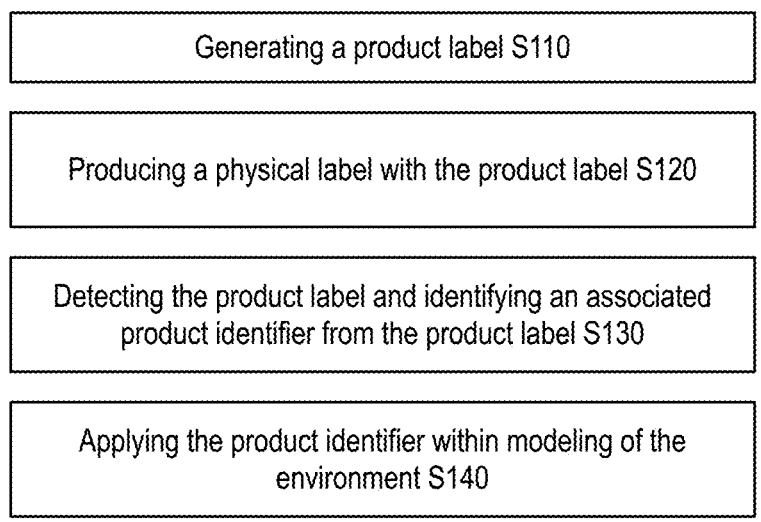
FIG. 10 is a flowchart representation of a method variation.

In one exemplary implementation of the method for product labeling, the method for universal product labeling can, as shown in FIG. 10, include a first stage of: generating a product label S110; and a second stage of: detecting the product label and identifying an associated product identifier from the product label S130. In some variations, the method may include (in connection with the first stage), producing a physical label with the product label S120. In some variations, the second stage may further include applying the product identifier within modeling of the environment S140.

In some method implementations, the product label is a graphical machine-readable code (i.e., a graphical code) that encodes information. A graphical machine-readable code may be defined through an arrangement of graphical data elements in different states. The graphical code may be one of the graphical code variations described herein.

In some method implementations, the product label is a packaging design that incorporates a graphical signature. A graphical signature variation may include receiving a digital packaging design and outputting an augmented packaging design with a detectable graphical signature.

In some method implementations, the product label is a masked graphical code that encodes detectable information in the packaging of a product. This masked graphical code variation may include receiving a digital packaging design and outputting an augmented packaging design with a graphical code embedded within the augmented packaging design.

In some method implementations, the product label is a detected in association with a plurality of related product labels. The method may decode the product labels in combination for grouped product identification. This implementation may be useful when products are too small for fully displaying a suitable label. So multiple partial product labels can be used to in combination to determine a product identity.

In some method implementations, the method can be implemented in combination with a partial product label, wherein the product label may encode reduced amounts of data for better visual detection. A partial product label may be used with: combining with CV item detection; signaling select information of a product like weight, price, etc.; uniquely identifying within a limited scope; and/or providing information used in other ways to determine the associated information.

Figure 11:
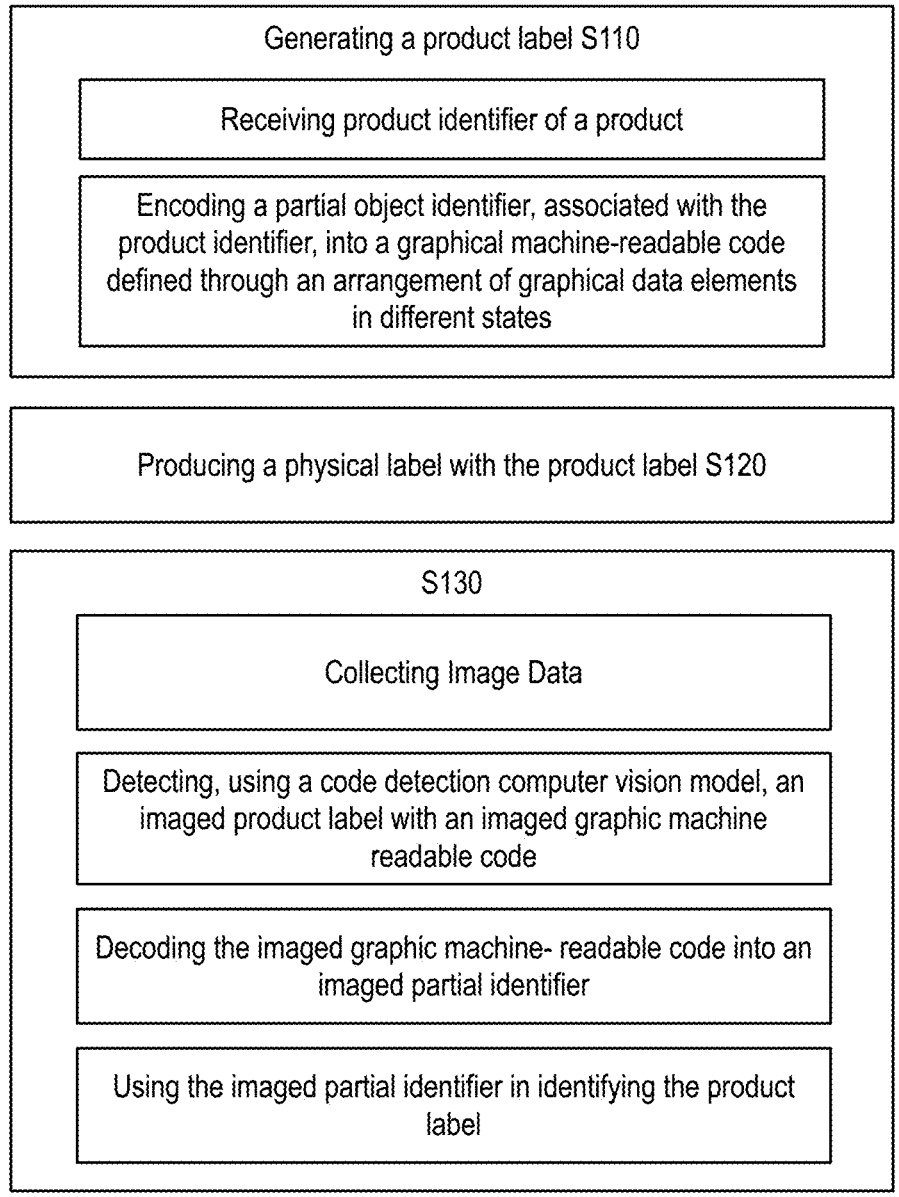
FIG. 11 is a flowchart representation of a method variation using a partial product label.

In one partial product label implementation, the method may include, as shown in FIG. 11, during a first stage: generating a product label, which comprises: receiving product identifier (e.g., information to associate with a labeled product such as a UPC or a product descriptor) of a product; and encoding a partial object identifier, associated with the product identifier, into a graphical machine-readable code defined through an arrangement of graphical data elements in different states. The first stage may, in some variations, include printing or otherwise producing a physical product label with the graphical machine-readable code. The size of the graphical data elements is calibrated to imaging resolution of imaging devices of an imaging system within an environment. The physical product label is at some point preferably applied to the intended product. During a subsequent stage, the method may include: collecting image data; detecting, using a code detection computer vision model, an imaged product label with an imaged graphic machine readable code; decoding the imaged graphic machine-readable code into an imaged partial identifier (i.e., an imaged code); and using the imaged partial identifier in identifying the product label.

In one related implemented variation, the partial identifier represents product information that partially defines the product. For example, the partial identifier may specify properties of a product such as product metrics like weight size, count, price, expiration date, or other suitable product property. This exemplary implementation may be used in combination with detecting, using item detection computer vision model, a product type identifier, wherein the product type identifier in combination with the metric may fully define the product information. For example, by-weight products may be identified (using CV processing model) and then the weight signaled through a partial product label.

Figure 12:
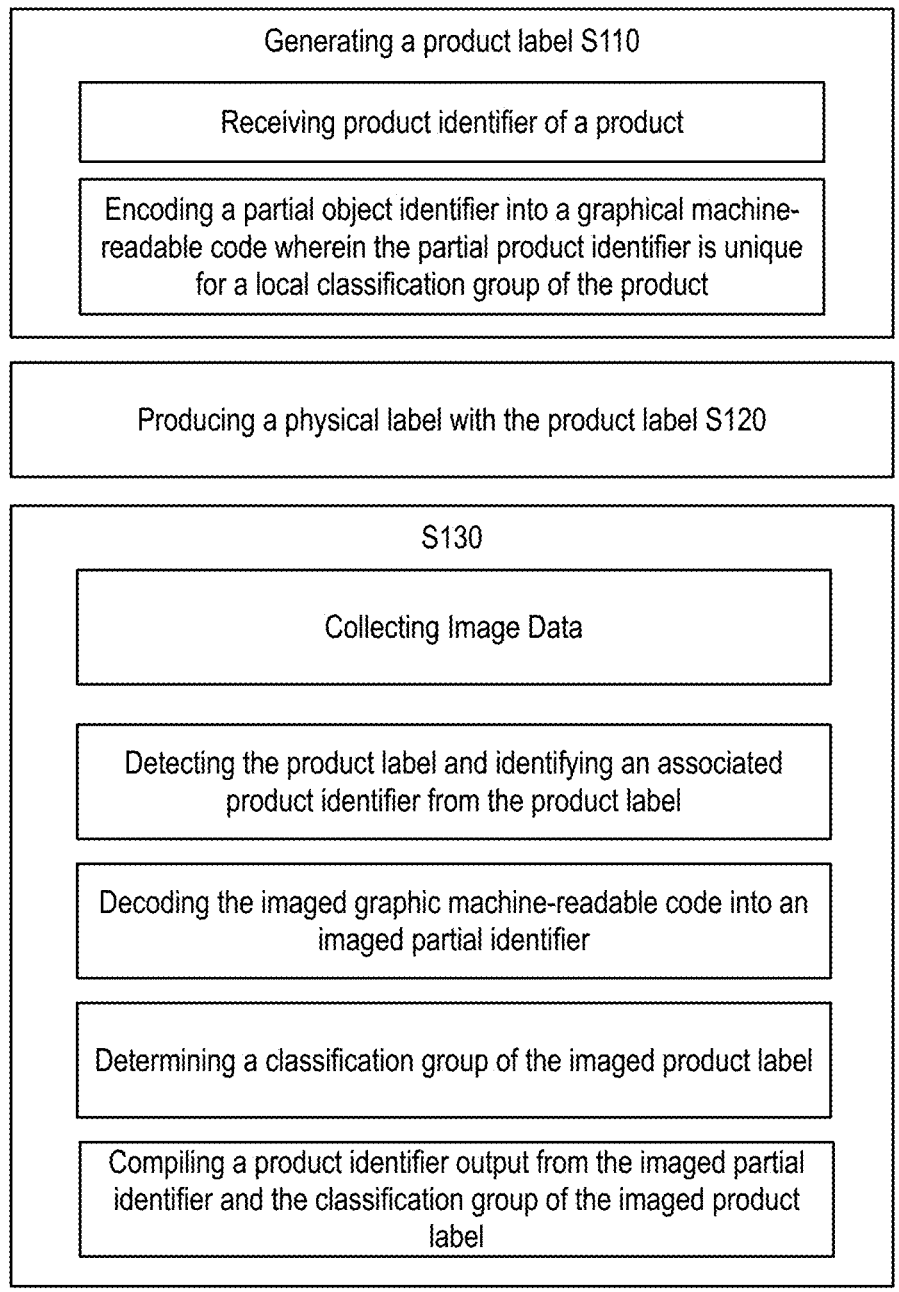
FIG. 12 is a flowchart representation of a method variation using a partial product label and classification group.

In one partial product label implementation that uses a classification group, the method may, as shown in FIG. 12, include during a first stage: generating a product label, which comprises: receiving product identifier (e.g., information to associate with a labeled product such as a UPC or a product descriptor) of a product; and encoding a partial product identifier, associated with the product identifier, into a graphical machine-readable code defined through an arrangement of graphical data elements in different states, wherein the partial product identifier is unique for a local classification group of the product. The first stage may, in some variations, include printing or otherwise producing a physical product label with the graphical machine-readable code. The size of the graphical data elements is calibrated to imaging resolution of imaging devices of an imaging system within an environment. The physical product label is at some point preferably applied to the intended product. During a subsequent stage, the method may include: collecting image data; detecting, using a code detection computer vision model, an imaged product label with an imaged graphic machine readable code; decoding the imaged graphic machine-readable code into an imaged partial identifier (i.e., an imaged code); determining a classification group of the imaged product label, and compiling a product identifier output from the imaged partial identifier and the classification group of the imaged product label.

Figure 13:
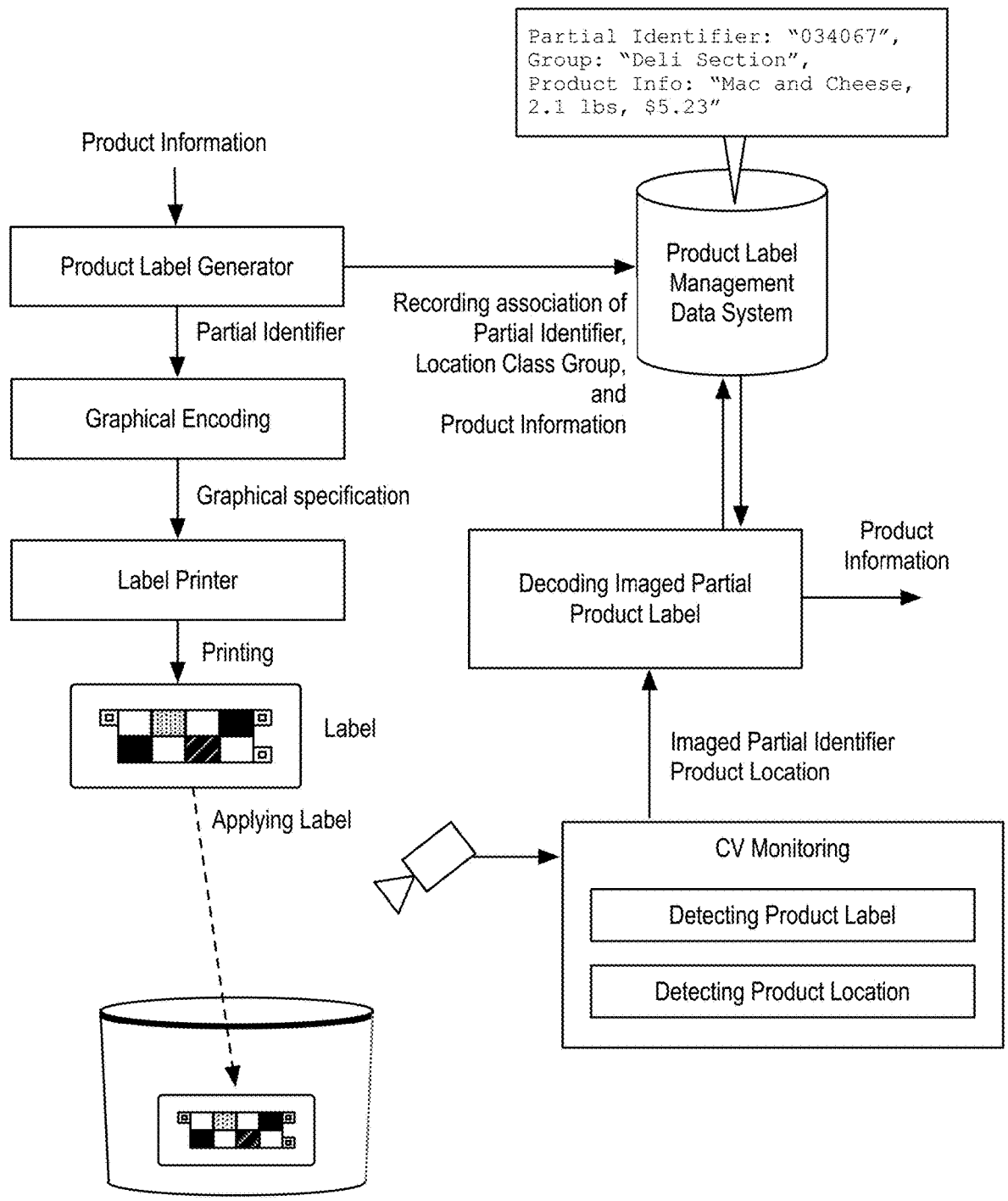
FIG. 13 is a schematic representation of a method variation using product location.

In some implementations, the local classification group described could be based on location, product type, product property, an environmental visual identifier, or other detail that can be determined when a product with the product label is detected. In one exemplary implementation, the classification group is based on location of the intended product; wherein determining a classification group of the imaged product label comprises determining location of the imaged graphic machine readable code and selecting the classification group of the imaged product label based on the location of the imaged graphic machine readable code as shown in FIG. 13. In such a variation, compiling an object identifier output can be based on the imaged partial identifier and the location of the imaged graphic machine readable code. In practice, this may enable different stores to maintain local codes. It may also enable one store to use product labels that are scoped to different regions of a store. Determining location may involve determining location using computer vision analysis of the image data. Determining location may alternatively include configuring location information of the imaging devices. In this way, for example, product labels detected by cameras in a meat section will be decoded using meat section codes, and product labels detected by cameras in a deli section may be decoded using deli section codes.

Figure 14:
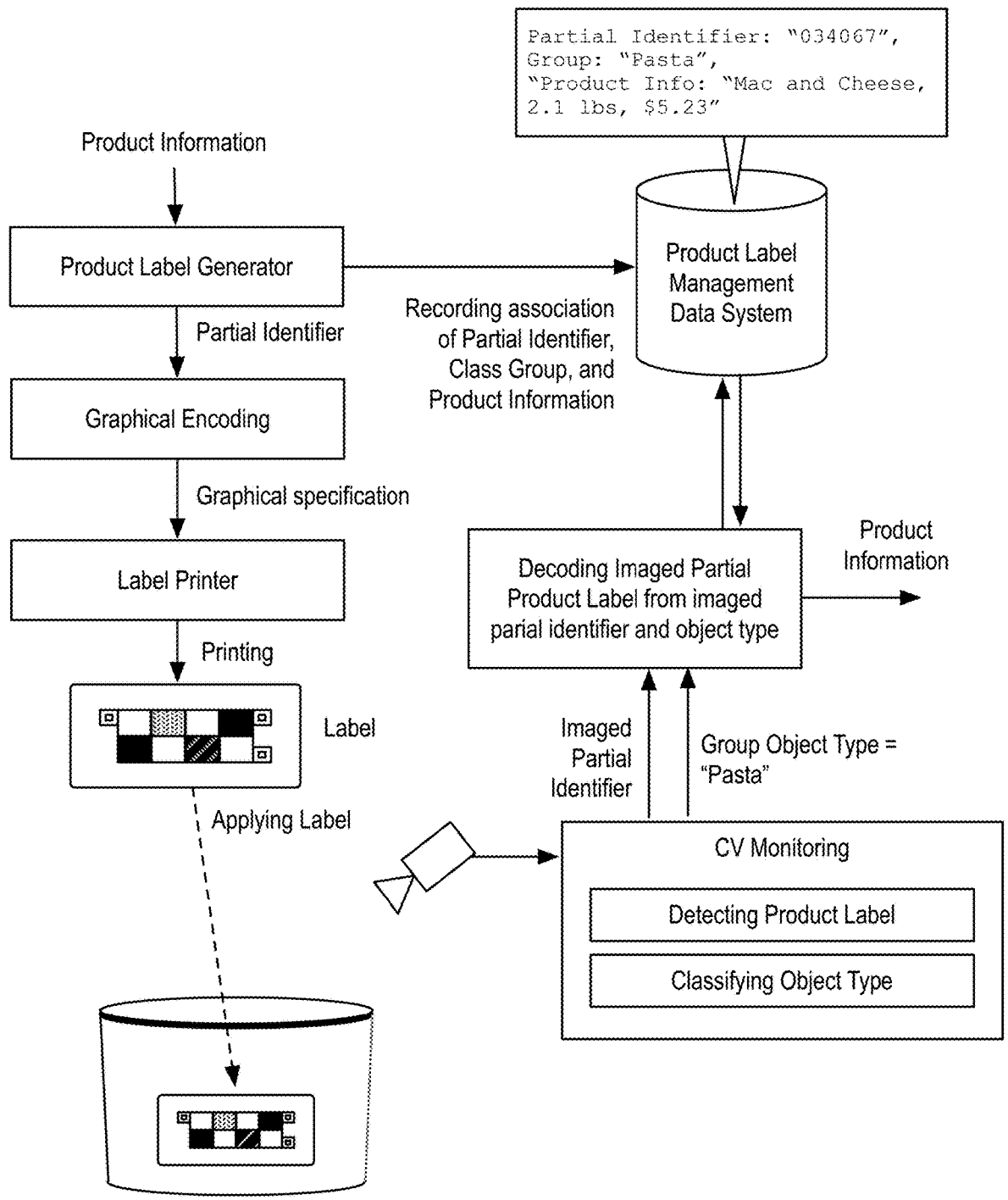
FIG. 14 is a schematic representation of a method variation using computer vision analysis of the product in combination with a product label.

In some implementations, the local classification group could be based on a CV detected property of the product, such as the product type, packaging, color, shape, display location, and/or any suitable property. In an example of such an implementation, determining a classification group of the imaged product label may include: detecting, through processing of the image data using a computer vision model, a product property, wherein the product property is associated with the local classification group as shown in FIG. 14. For example, the partial product identifier may be unique for wrapped sandwich product types. When a physical product label is detected and the CV monitoring system determines the associated product to be a "wrapped sandwich" product type, the product identifier may be determined since the partial product label is unique to wrapped sandwiches.

Figure 15:
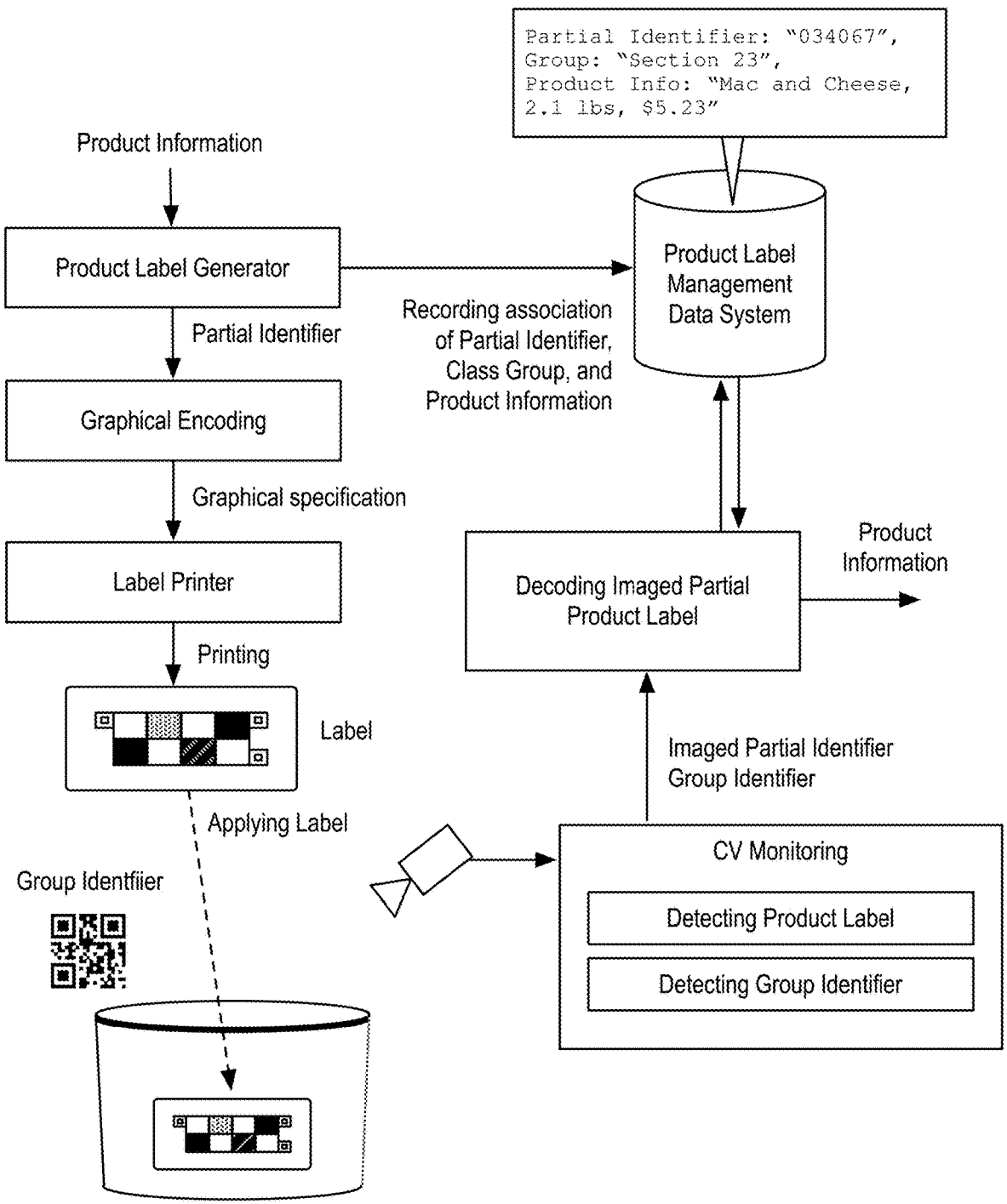
FIG. 15 is a schematic representation of a method variation using computer vision detected group identifier in combination with a product label.

In some implementations, the local classification group could be based on a CV detected indicator in the environment. A second classifier graphical code that encodes the classifier group information can be placed within the environment in proximity to appropriate products such that they can be properly identified. Since there may be less restrictions on the classifier graphical codes it may be a traditional graphical code like a large QR code, but it may alternatively use one of the code variations described herein. In an example of such an implementation, determining a classification group of the imaged product label may include: detecting, through processing of the image data using a computer vision model, a classifier graphical code, decoding the classifier graphical code into an identifier of the classification group thereby determining the classification group as shown in FIG. 15. For example, a meat counter in a grocery store may hang a QR code indicating that that region of the store should have product labels scoped to the QR codes associated classification group.

In one variation, the above method variations may alternatively be adapted for use with a graphical signatures, other product label variations described herein, or other suitable graphics with encoded information. As one example of an alternative graphical format, a small set of characters (alphanumeric, Hexadecimal characters, numeric characters, glyphs, etc.) may be used in large type (e.g., greater than 1 cm) possibly using a font configured for machine reading. During detection, the arrangement of the characters may be detected in the image data, and then Optical Character Recognition (OCR) model may be applied to that segment of image data to transform into machine encoded characters.

In another exemplary implementation, the physical product label is preferably configured for detection from a displaced imaging device. In some situations, the imaging device may be displaced by more than nine feet though conditions may vary. In one such implementation, each graphical data element is sized in the physical product label greater than one centimeter in one dimension (e.g., diameter of dot, width of a rectangular block, side/height of triangle). For example, in another exemplary implementation, each graphical data element is sized in the physical product label greater than half a centimeter in one dimension. Such implementations are provided as an example, because depending on the imaging device resolution and configuration of monitoring (distance/angle of the imaging device from the furthest monitoring region), other dimensions may alternatively be used. Characterized in terms of pixels, physical product label may be calibrated for imaging resolution of imaging devices of an imaging system within an environment such that a graphical data element is imaged by a minimum number of pixels when the product label is detected in expected stocking locations (e.g., on display shelves).

In one exemplary implementation, the physical product label is a binary colored graphical code wherein the graphical data elements are in one of two states.

In another exemplary implementation, the physical product label has three or more color states, wherein graphical data elements are each in one of a set of three or more color states.

In a partial product label implementation, the product code may encode a limited language of codes (e.g., partial identifiers). In some implementations, the machine-readable code may, for example, encode less than one million, one hundred thousand, or ten thousand unique codes. The graphical codes may incorporate error correction and parity, and/or other machine code features.

In some implementations, a product label management system that includes a data system can be used to record associations of a product label and product identifiers. In many variations, the data system may be used in resolving the product information after detecting a product label. In such implementations, the method may include in the initial stage storing a data record in a product label management data system, where the data record associates the partial product identifier to the product identifier. When scoped to a local classifier group, then storage of the data record may associate the combination of the product identifier and the local classification group to the product identifier. For example, the local classification group may determine which data system to search. In another example, the product identifiers may be uniquely indexed in a database by partial product identifier and the local classification group. The product identifier may be a product code identifier (e.g., a UPC). The product identifier may alternatively be product description, such as a full line item description with product type, weight, date of packaging, and the like. In such a variation, during the subsequent stage, compiling a product identifier output from the imaged partial identifier and the classification group of the imaged product label may include: querying the code management data system and accessing a retrieved data record corresponding to the imaged code and the local classification group. Use of a database may not depend on a classification group if, for example, the code size is large enough to accommodate the necessary number of partial product identifiers.

In implementations using low code vocabularies (partial product identifiers with a limited numbers of codes), the method may involve monitoring usage and clearing code namespace when use of a code is done.

Figure 16:
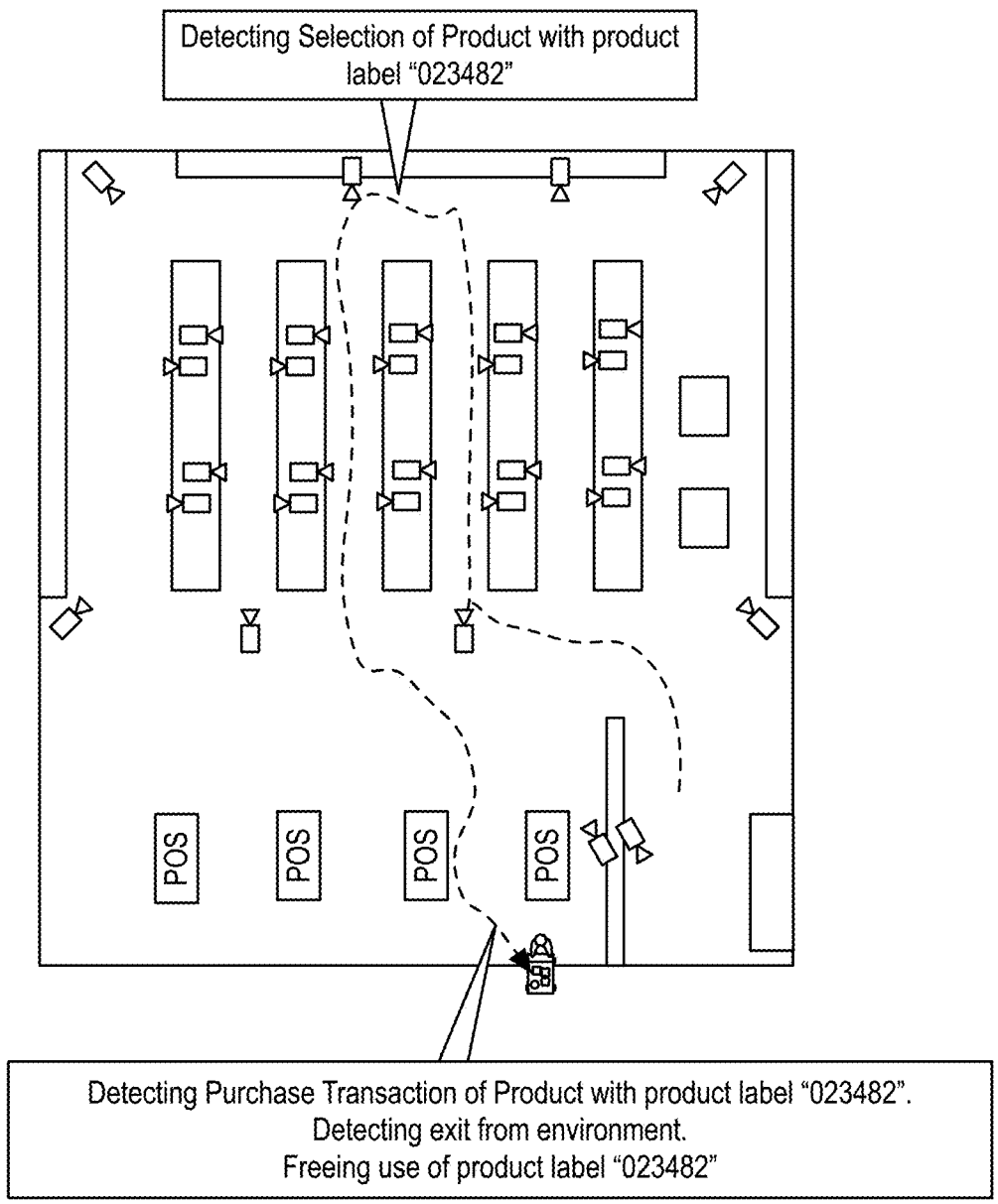
FIG. 16 is an exemplary schematic representation of a method managing use of product label codes.

For partial product identifiers that are used on individual items and when the space for the number of partial product identifiers is limited, the method can track state of partial product identifier codes so that they may be released for use when it's determined a product label encoding the partial product identifier is unlikely to be seen in the environment. Partial product identifiers may become available for use in response to interactions with the product, location of the product, not seeing the product identifier for some amount of time, and/or other end of use conditions. In response, the method can include updating the product label management system to free usage of the partial product identifier for a new product identifier. In one example, the method may include detecting when the product (to which the physical product label is attached) leaves the environment. This may involve tracking location of the product and detecting the product leaving the environment. This may alternatively involve detecting when the state of product satisfies a condition where it may be removed from the system as shown in FIG. 16. For example, use of a code by partial product identifier may be ended when a customer picks up or otherwise obtains possession of the product. Accordingly, implementations of the method may include detecting, through processing the image data using a user-item detection model/process, a user take possession of the product and updating the product label management system to free usage of the partial product identifier for a new product identifier.

Block S110, which includes generating a product label, functions to generate a label such as one described above. The product label may be any one or combination of the types of product labels described herein such as a partial product label, non-visible graphic variation of a product label that encodes information in a graphical code, a product label using one or more select color spectrum graphical codes, an alternative visible spectrum graphical code product label that is discretely integrated into the graphics of a product, a color space or visual signature product label, and/or other suitable type of product label. In the case of graphical codes, information related to a product identifier may be encoded within the product label such that the product identifier is detectable through decoding of the product label. In other variations, generating a product label may include registering a visual signature or other information related to the product label such that for some analysis of the product label one or more product identifier (or other associated information) can be supplied.

Generating the product label may be performed at a centralized computing system such as a product label management system which may be on onsite computing system or a remote computing system.

In some variations, the generating the product label is performed in response to a communication request from a client device. The client device may be label printing device in the environment. This may involve: at the client device, setting the product information (e.g., the product identifier), communicating the product information to the product label management system, at the product label management system creating the product label and communicating the product label to the client device, and then at the client device printing or otherwise applying the product label to a product.

Block S120, which includes producing a physical label with the product, functions to produce and use the product label. The physical label is preferably applied to a product. For example, producing a physical label may make a label sticker that can be adhered to a product. In some of the packaging focused variations, producing the physical label involves manufacturing packaging of the product. In such variations, the product label may be integrated with the product packaging or other attached marketing material for a product. In one variation, applying the product label may include printing the product label onto a product or product packaging. In another variation, applying the product label may include attaching the product label to a tag or other connected object. In another variation, applying the product label may include placing signage that includes the product label in proximity to an associated product.

The product label is preferably applied in at least one location, but the product label can also be placed multiple times on a product. In some variations, the product label is applied as a pattern across one or more surfaces of a product or product packaging.

Block S130, which includes detecting the product label and identifying an associated product identifier from the product label, functions to use an imaging system to collect an image of the product label and convert that image into a product identifier or other types of associated information. Detecting the product label may include collecting image data and segmenting and/or otherwise identifying product labels in the image data. Block S130 may incorporate one or more of the variations described herein for resolving the product identifier from a detected product label.

Collecting image data, functions to collect video, pictures, or other imagery of an environment to be used as default set of image data for computer vision processing. The image data is preferably captured over a region expected to contain objects of interest (e.g., inventory items) and interactions with such objects. Image data may be collected from across the environment from a set of multiple imaging devices. Collecting image data may occur from a variety of capture points. The set of capture points can include overlapping and/or non-overlapping views of monitored regions in an environment. Alternatively, the method may utilize a single imaging device, where the imaging device has sufficient view of the exercise station(s). The image data preferably substantially covers a continuous region. However, the method can accommodate for holes, gaps, or uninspected regions. In particular, the method may be robust for handling areas with an absence of image-based surveillance such as bathrooms, hallways, and the like.

The image data may be directly collected, and may be communicated to an appropriate processing system. The image data may be of a single format, but the image data may alternatively include a set of different image data formats. The image data can include high resolution video, low resolution video, photographs from distinct points in time, image data from a fixed point of view, image data from an actuating camera, visual spectrum image data, infrared image data, 3D depth sensing image data, parallax, lidar, radar, sonar, passive illumination, active illumination, and/or any suitable type of image data.

The method may be used with a variety of imaging systems, collecting image data may additionally include collecting image data from a set of imaging devices set in at least one of a set of configurations. The imaging device configurations can include: aerial capture configuration, shelf-directed capture configuration, movable configuration, and/or other types of imaging device configurations. Imaging devices mounted over-head are preferably in an aerial capture configuration and are preferably used as a main image data source. In some variations, particular sections of the store may have one or more dedicated imaging devices directed at a particular region or product so as to deliver content specifically for interactions in that region. In some variations, imaging devices may include worn imaging devices such as a smart eyewear imaging device. This alternative movable configuration can be similarly used to extract information of the individual wearing the imaging device or other observed in the collected image data.

For some variations of product labels, collecting image data may include additional processes for collecting image data of the product labels. In one variation, collecting image data may include activating product label imaging. In some variations, this may include activating an illumination device to interrogate the environment to reveal present product labels. For example, a flash may be triggered and image data collected in coordination with the flash for product labels leveraging reflectance-based medium for product labels. As another example, IR or UV light may be activated to detect product labels using product labels using corresponding non-visible spectrum inks.

Segmenting and/or otherwise identifying product labels in the image data functions to locate one or more regions of the image data containing a product label. The method can be used in environments where there may be multiple instances of the same product and/or multiple different products captured within image data of one camera. As such, the field of view of one imaging device may include multiple products containing different (or the same) product label. The collected image data can be segmented into individual subregions containing product labels. This may use a product or object segmentation model to identify objects that seem to be products and then search for product labels within these regions. In another variation an image object classifier may be trained for detection of product labels and detect each instance of a product label. Each of these product labels can be individually processed. However, in some cases, group analysis may be used in determining the product identifier.

Identifying an associated product identifier from the product label in one variation uses a decoding process for transformation of the product label image data into information. This variation can be used when the product label is a graphical code. Identifying an associated product identifier from the product label in another variation performs some analysis on the product label and then uses the result of the analysis to determine a product identifier. For example, the product label image data may be converted into a visual signature, which can be used to query a database for an associated product identifier. Other suitable techniques may alternatively be used.

Block S140, which includes applying the product identifier within modeling of the environment, functions to use the product identifier for one or more purposes. In one variation, the product identifier is used for updating an automated checkout system. In another variation, the product identifier is used in an inventory and/or stock tracking system. In another variation, the product identifier is used in updating inventory management, which may involve triggering various operations-based actions like product ordering, worker alerts, and the like. In the variation where the label acts as an environmental label, the information from the label may be used to change the monitoring and/or interaction modeling based on the detection of that label. For example, an environment label may be used to designate a region as an entry region, exit region, checkout region, a do-not-track region, and/or any suitable context-specific region to the monitoring system. As such the monitoring and actions taken by a monitoring system can be augmented in response to environment labels and their placement in the environment.

4. System Architecture

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

In one variation, a system comprising of one or more computer-readable mediums (e.g., a non-transitory computer-readable medium) storing instructions that, when executed by the one or more computer processors, cause a computing platform to perform operations comprising those of the system or method described herein such as: a first stage of generating an object label S10 and producing the object label S20, and a second stage of detecting the object label and identifying an associated object identifier from the object label S30.

Figure 17:
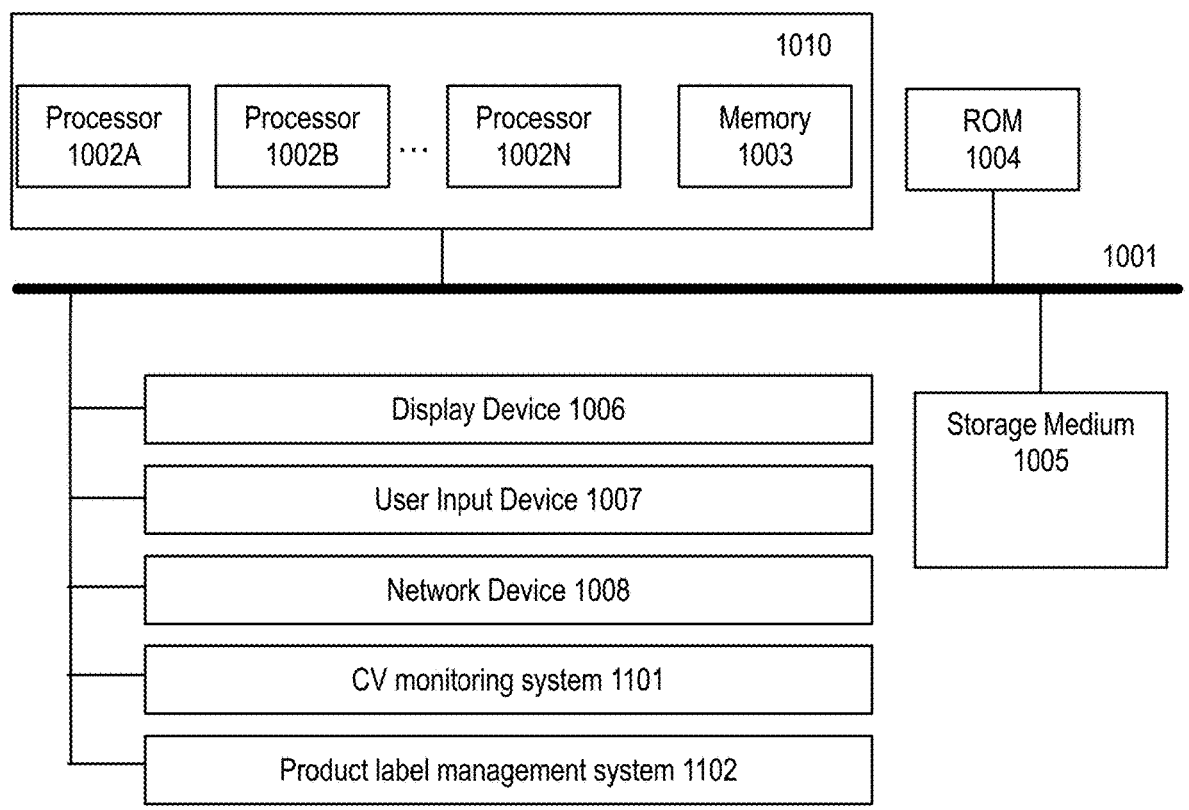
FIG. 17 is an exemplary system architecture that may be used in implementing the system and/or method.

FIG. 17 is an exemplary computer architecture diagram of one implementation of the system. In some implementations, the system is implemented in a plurality of devices in communication over a communication channel and/or network. In some implementations, the elements of the system are implemented in separate computing devices. In some implementations, two or more of the system elements are implemented in same devices. The system and portions of the system may be integrated into a computing device or system that can serve as or within the system.

The communication channel 1001 interfaces with the processors 1002A-1002N, the memory (e.g., a random access memory (RAM)) 1003, a read only memory (ROM) 1004, a processor-readable storage medium 1005, a display device 1006, a user input device 1007, and a network device 1008. As shown, the computer infrastructure may be used in connecting CV monitoring system 1101, product label management system 1102, and/or other suitable computing devices.

The processors 1002A-1002N may take many forms, such CPUs (Central Processing Units), GPUs (Graphical Processing Units), microprocessors, ML/DL (Machine Learning/ Deep Learning) processing units such as a Tensor Processing Unit, FPGA (Field Programmable Gate Arrays, custom processors, and/or any suitable type of processor.

The processors 1002A-1002N and the main memory 1003 (or some sub-combination) can form a processing unit 1010. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of the elements of the system.

A network device 1008 may provide one or more wired or wireless interfaces for exchanging data and commands between the system and/or other devices, such as devices of external systems. Such wired and wireless interfaces include, for example, a universal serial bus (USB) interface, Bluetooth interface, Wi-Fi interface, Ethernet interface, near field communication (NFC) interface, and the like.

Computer and/or Machine-readable executable instructions comprising of configuration for software programs (such as an operating system, application programs, and device drivers) can be stored in the memory 1003 from the processor-readable storage medium 1005, the ROM 1004 or any other data storage system.

When executed by one or more computer processors, the respective machine-executable instructions may be accessed by at least one of processors 1002A-1002N (of a processing unit 1010) via the communication channel 1001, and then executed by at least one of processors 1001A-1001N. Data, databases, data records or other stored forms data created or used by the software programs can also be stored in the memory 1003, and such data is accessed by at least one of processors 1002A-1002N during execution of the machine-executable instructions of the software programs.

The processor-readable storage medium 1005 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 1005 can include an operating system, software programs, device drivers, and/or other suitable sub-systems or software.

As used herein, first, second, third, etc. are used to characterize and distinguish various elements, components, regions, layers and/or sections. These elements, components, regions, layers and/or sections should not be limited by these terms. Use of numerical terms may be used to distinguish one element, component, region, layer and/or section from another element, component, region, layer and/or section. Use of such numerical terms does not imply a sequence or order unless clearly indicated by the context. Such numerical references may be used interchangeable without departing from the teaching of the embodiments and variations herein.

As a person skilled in the art will recognize from the previous detailed description and from the figures and claims, modifications and changes can be made to the embodiments of the invention without departing from the scope of this invention as defined in the following claims.

I claim:

1. A method for sensor detectable physical labels comprising:
   receiving a product identifier of a product;
   encoding a partial product identifier into a graphical machine-readable code, wherein the partial product identifier is unique for a local classification group and is associated with the product identifier;
   at the imaging devices of the imaging system, collecting image data;
   detecting, by processing the image data using a code detection computer vision model, an imaged product label with an imaged graphic machine readable code;
   decoding the imaged graphic machine-readable code into an imaged partial identifier;
   determining a classification group of the imaged product label; and
   compiling a product identifier output from the imaged partial identifier and the classification group of the imaged product label.

2. The method of claim 1, wherein the graphical machine-readable code is defined through an arrangement of graphical data elements in different states, and wherein each graphical data element is sized in the physical product label greater than one centimeter in one dimension.

3. The method of claim 1, wherein the graphical machine-readable code is defined through an arrangement of graphical data elements in different states, and wherein graphical data elements are each in one of a set of three or more color states.

4. The method of claim 1, wherein the classification group is based on location; wherein determining a classification group of the imaged product label comprises determining location of the imaged graphic machine readable code and selecting the classification group of the imaged product label based on the location of the imaged graphic machine readable code.

5. The method of claim 1, wherein the partial product identifier represents a weight property.

6. The method of claim 1, further comprising storing a data record in a product label management data system, where the data record associates the partial product identifier to the product identifier.

7. The method of claim 6, further comprising detecting, through processing of image data, the product satisfying an end of use condition and in response updating the product label management system to free usage of the partial product identifier for a new product identifier.

8. The method of claim 1, wherein determining a classification group of the imaged product label may include: detecting, through processing of the image data using a computer vision model, a product property, wherein the product property is associated with the local classification group.

9. The method of claim 1, wherein determining a classification group of the imaged product label comprises: detecting, through processing of the image data using a computer vision model, a classifier graphical code and decoding the classifier graphical code into an identifier of the classification group thereby determining the classification group.

10. The method of claim 1, further comprising applying the product label to the product.

11. The method of claim 1, wherein the partial product identifier represents a price property.

12. A system for product label detection comprising:
    a computer vision monitoring system with a plurality of imaging devices distributed in an environment, the computer vision monitoring system configured to collect image data;
    a label management system comprising one or more computer-readable mediums storing instructions that, when executed by the one or more computer processors, cause a computing platform to perform operations comprising:
      receiving a product identifier of a product;
      encoding a partial product identifier into a graphical machine-readable code, wherein the partial product identifier is unique for a local classification group and is associated with the product identifier;
      detecting, by processing the image data using a code detection computer vision mode, an imaged product label with an imaged graphic machine readable code;
      decoding the imaged graphic machine-readable code into an imaged partial identifier;
      determining a classification group of the imaged product label; and
      compiling a product identifier output from the imaged partial identifier and the classification group of the imaged product label.

13. The system of claim 12, wherein the graphical machine-readable code is defined through an arrangement of graphical data elements in different states, and wherein each graphical data element is sized in the physical product label greater than one centimeter in one dimension.

14. The system of claim 12, wherein the classification group is based on location; wherein determining a classification group of the imaged product label comprises determining location of the imaged graphic machine readable code and selecting the classification group of the imaged product label based on the location of the imaged graphic machine readable code.

15. The system of claim 12, further comprising storing a data record in a product label management data system, where the data record associates the partial product identifier to the product identifier.

16. The system of claim 15, further comprising detecting, through processing of image data, the product satisfies an end of use condition and in response updating the product label management system to free usage of the partial product identifier for a new product identifier.

17. The system of claim 12, wherein the partial product identifier represents one of a price property or a weight property.

18. A non-transitory computer-readable medium storing instructions that, when executed by one or more computer processors of a computing platform, cause the computing platform to:
    receiving a product identifier of a product;
    encoding a partial product identifier into a graphical machine-readable code wherein the partial product identifier is unique for a local classification group and is associated with the product identifier;

at the imaging devices of the imaging system, collecting image data;

detecting, by processing the image data using a code detection computer vision model, an imaged product label with an imaged graphic machine readable code;

decoding the imaged graphic machine-readable code into an imaged partial identifier;

determining a classification group of the imaged product label; and compiling a product identifier output from the imaged partial identifier and the classification group of the imaged product label.

19. The non-transitory computer-readable medium of claim 18, wherein the graphical machine-readable code is defined through an arrangement of graphical data elements in different states, and wherein each graphical data element is sized in the physical product label greater than one centimeter in one dimension.

20. The non-transitory computer-readable medium of claim 18, wherein the graphical machine-readable code is defined through an arrangement of graphical data elements in different states, and wherein graphical data elements are each in one of a set of three or more color states.

21. The non-transitory computer-readable medium of claim 18, wherein the classification group is based on location; wherein determining a classification group of the imaged product label comprises determining location of the imaged graphic machine readable code and selecting the classification group of the imaged product label based on the location of the imaged graphic machine readable code.

22. The non-transitory computer-readable medium of claim 18, further comprising storing a data record in a product label management data system, where the data record associates the partial product identifier to the product identifier.

23. The non-transitory computer-readable medium of claim 22, further comprising detecting, through processing of image data, the product satisfies an end of use condition and in response updating the product label management system to free usage of the partial product identifier for a new product identifier.

24. The non-transitory computer-readable medium of claim 18, wherein the partial product identifier represents one of a price property or a weight property.

* * * * *